United States Patent [19]

Horike et al.

[11] 4,426,652

[45] Jan. 17, 1984

[54] INK JET PRINTING APPARATUS

[75] Inventors: Masanori Horike; Yutaka Ebi, both of Tokyo, Japan

[73] Assignee: Ricoh Company, Ltd., Tokyo, Japan

[21] Appl. No.: 310,688

[22] Filed: Oct. 13, 1981

[30] Foreign Application Priority Data

Oct. 16, 1980 [JP] Japan ............................ 55-144882

[51] Int. Cl.[3] ............................................ G01D 15/18

[52] U.S. Cl. .................................. 346/75; 346/140 R

[58] Field of Search .................. 346/75, 140; 330/144

[56] References Cited

U.S. PATENT DOCUMENTS 3,828,354 8/1974 Hilton .................................. 346/75
3,866,237 2/1975 Meier .................................. 346/75
3,898,673 8/1975 Haskell ................................ 346/140
3,992,713 11/1976 Carmichael et al. ................ 346/75
4,060,813 11/1977 Yamanda et al. ..................... 346/75
4,229,749 10/1980 Tillmore .............................. 346/75
4,286,273 8/1981 Horike ................................ 346/75

*Primary Examiner*—Patrick R. Salce
*Assistant Examiner*—Todd E. De Boer
*Attorney, Agent, or Firm*—David G. Alexander

[57] ABSTRACT

An ink jet printing apparatus includes a controllable gain charge amplifier circuit adapted to supply a charging electrode with a charge voltage. A reference charge voltage is coupled to the charging electrode to detect an actual position to which charged ink droplets are deflected. The gain of the amplifier circuit is automatically determined so that the actual deflection position coincides with a predetermined reference position. Moreover, the determined gain of the amplifier is automatically adjusted in accordance with charges on preceding droplets to compensate for any distortion of a charge to be deposited on an immediately following droplet attributed to the charges on the preceding droplets.

6 Claims, 27 Drawing Figures

INK JET PRINTING APPARATUS

BACKGROUND OF THE INVENTION

The present invention generally relates to a deflection control ink jet printing apparatus of the type which ejects ink under pressure from a nozzle, applies vibration to the ejected ink to form ink droplets regularly, develops a multi-level electric field selectively in accordance with an image signal when each ink droplet shapes itself, charges ink droplets by the electric field, and deflects charged ink droplets by a deflecting electric field to a multiplicity of levels. More particularly, the present invention is directed to a charge level setting device which can automatically set and adjust a charging level to promote adequate deflection of charged ink droplets.

In such a multi-value or multi-level deflection control type ink jet printer, one nozzle is alotted to cover three or more picture elements (e.g. 40 dots in a width of 5 mm, assuming 8 dots/mm). Printing ink droplets are charged to three or more levels (e.g. 40 levels) to be deflected along three or more different paths (e.g. 40 paths). A recording medium in the form of a paper sheet is placed at a relatively large distance from a nozzle of the printer. With this in view, ink is pressurized to a level high enough for a droplet thereof from the nozzle to reach the recording sheet in a stable manner along a predetermined path, despite its passage through the charging and deflecting electric fields. In order that ink droplets of a given diameter may appear regularly and follow their predetermined paths accurately, it is a prerequisite that a variety of factors such as a viscosity and pressure of ink, a vibrating pressure, an amount of charge and an intensity of electric field for deflection be stabilized and controlled exactly.

However, it is impossible in practice to hold all such factors under fully controlled conditions. A known ink jet printer has a plurality of ink ejection holes arranged such that a string of ink droplets from each ejection hole are charged to several different levels to print dots in different positions on a paper sheet and, thereby, reproduce an image continuously together with those ejected from the adjacent holes. In this type of ink jet printer in particular, the impracticality of the ideal control over the various factors may cause the droplets from adjacent holes to become spaced from said other, overlapped each other or otherwise misdeflected. Where a printer head having a single ejection hole is moved in a direction perpendicular to the direction of deflection, the maximum width of deflection becomes either expanded or contracted.

These problems have hitherto been settled by an expedient in which an actual deflection position of ink droplets of a given deflection step in detected, a charging voltage is so adjusted as to permit said ink droplets to reach a predetermined reference position, and then charging voltages for the other deflection steps are computed from the thus determined charging voltage.

Another cause of misdeflection of an ink droplet is the distortion of its charge attributable to the charges on ink droplets which are flying just a head of it. In detail, image signals have two different levels, "1" and "0", regularly or randomly in accordance with original images while ink droplets are selectively charged and non-charged corresponding to the "1" and "0" signal levels. An electric field developed by the charges on one to four preceding droplets affect a droplet which is about to be charged; the following droplet will be deposited with a less charge than would be deposited by the actual voltage without any disturbance. It is therefore desirable that any distortion in deflection be compensated for in accordance with the charges on the preceding droplets and the distribution of flying droplets.

SUMMARY OF THE INVENTION

It is an object of the present invention to provide a new charge level setting device which, installed in a multi-value deflection control type ink jet printer, is capable of automatically setting charge voltages for deflection of a plurality of steps other than at least one, which serves as a reference step, merely by setting a charge voltage for the reference step only.

It is another object of the present invention to provide a new charge level setting device which not only sets charge voltages for the respective steps quickly but compensates for any distortion in the charge of an ink droplet attributable to preceding charged droplets.

In order to achieve these objects, an ink jet printing apparatus embodying the present invention employs an amplifier circuit with a controllable or adjustable gain to supply charging voltages to a charging electrode. A reference charging voltage is applied to the charging electrode to detect an actual deflected position of charged ink droplets. Then, the gain of the amplifier circuit is adjusted automatically so that the actual deflected position coincides with a reference position. Additionally, the gain is automatically controlled in accordance with the charge on at least one preceding charged ink droplet to thereby compensate for any distortion in the charge of a droplet attributable to the preceding one.

It is another object of the present invention to provide a generally improved ink jet printing apparatus.

Other objects, together with the foregoing, are attained in the embodiments described in the following description and illustrated in the accompanying drawings.

BRIEF DESCRIPTION OF THE DRAWINGS

FIGS. 2*c*, 2*c*-1, 2*c*-2 is a flowchart indicating the details of adjustment of deflection amount;

FIG. 3 is a block diagram showing a modified form of a charge voltage generator;

FIGS. 4*b*, 4*b*-1 to 4*b*-4 is a block diagram indicating an electric circuit arrangement associated with the mechanical arrangement shown in FIG. 4*a;*

FIGS. 5*c*, 5*c*-1, 5*c*-2 is a flowchart indicating the details of adjustment of charging level.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

An amount of deflection or a deflection to a predetermined position can be detected by either one of two known systems: one which employs a pair of static induction type charge detecting electrodes located to face each other through a determined deflection path and detects an amount of deflection based on a difference between their output signals, and the other which directly detects impingement of charged ink droplets by one, two or three electrodes. Particular reference will be made to the second-mentioned system in the description given hereinafter.

Figure 1A:
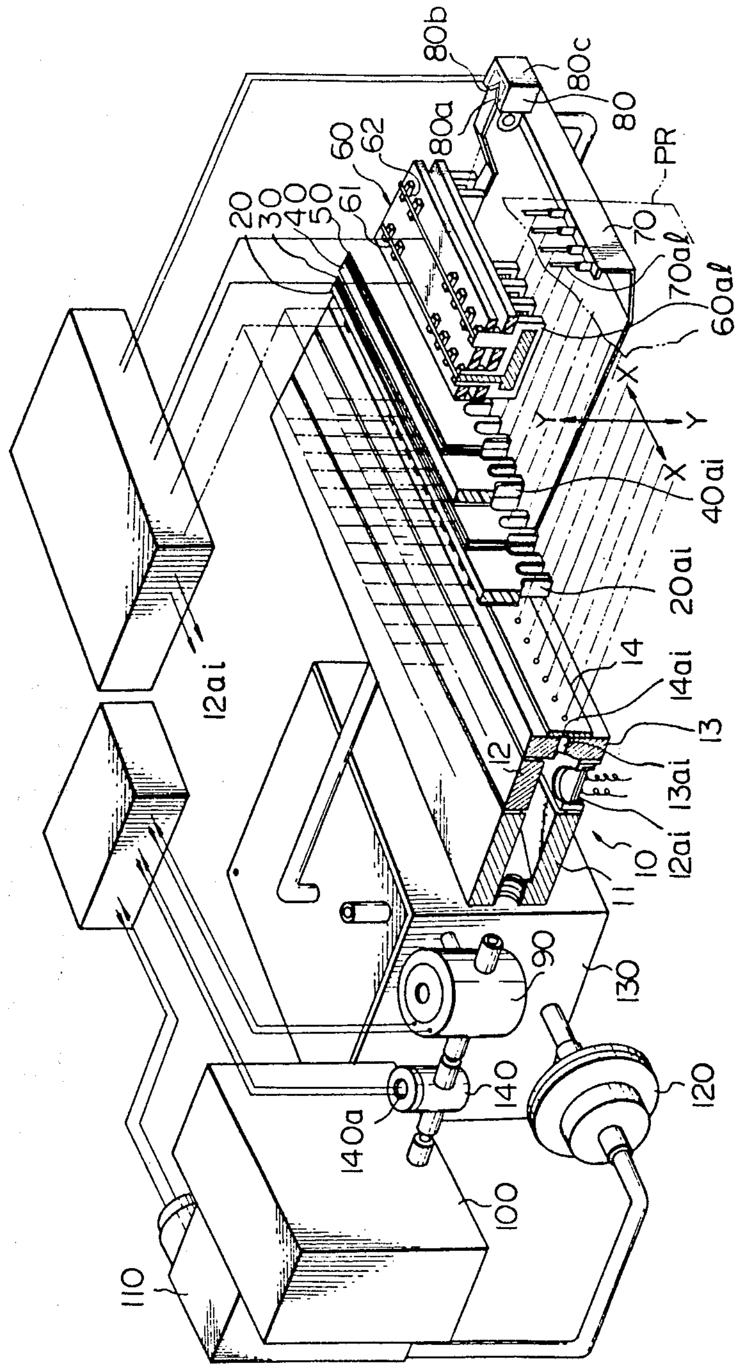
FIG. 1*a* shows in perspective form the mechanical arrangement of an ink jet printing apparatus embodying the present invention.
Figure 1A:
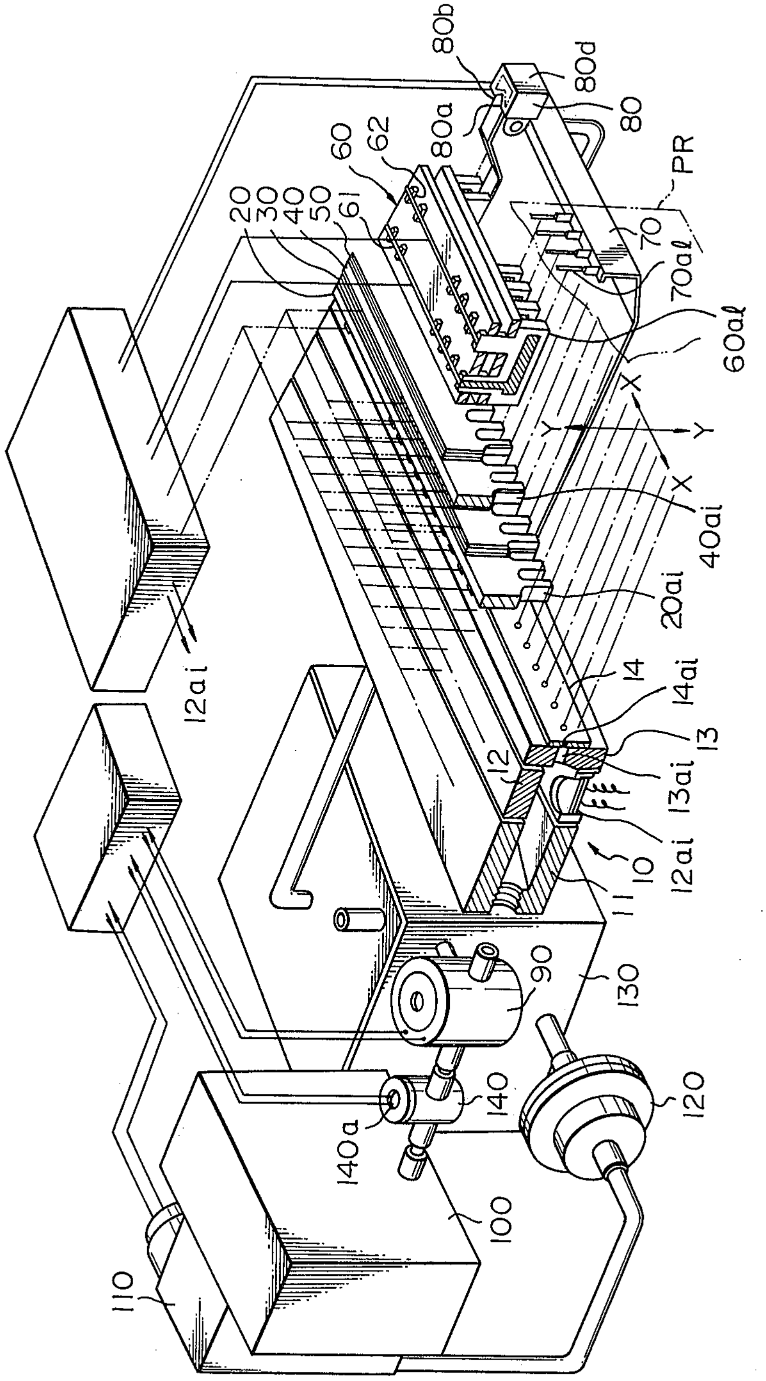
Figures 1, 1B:
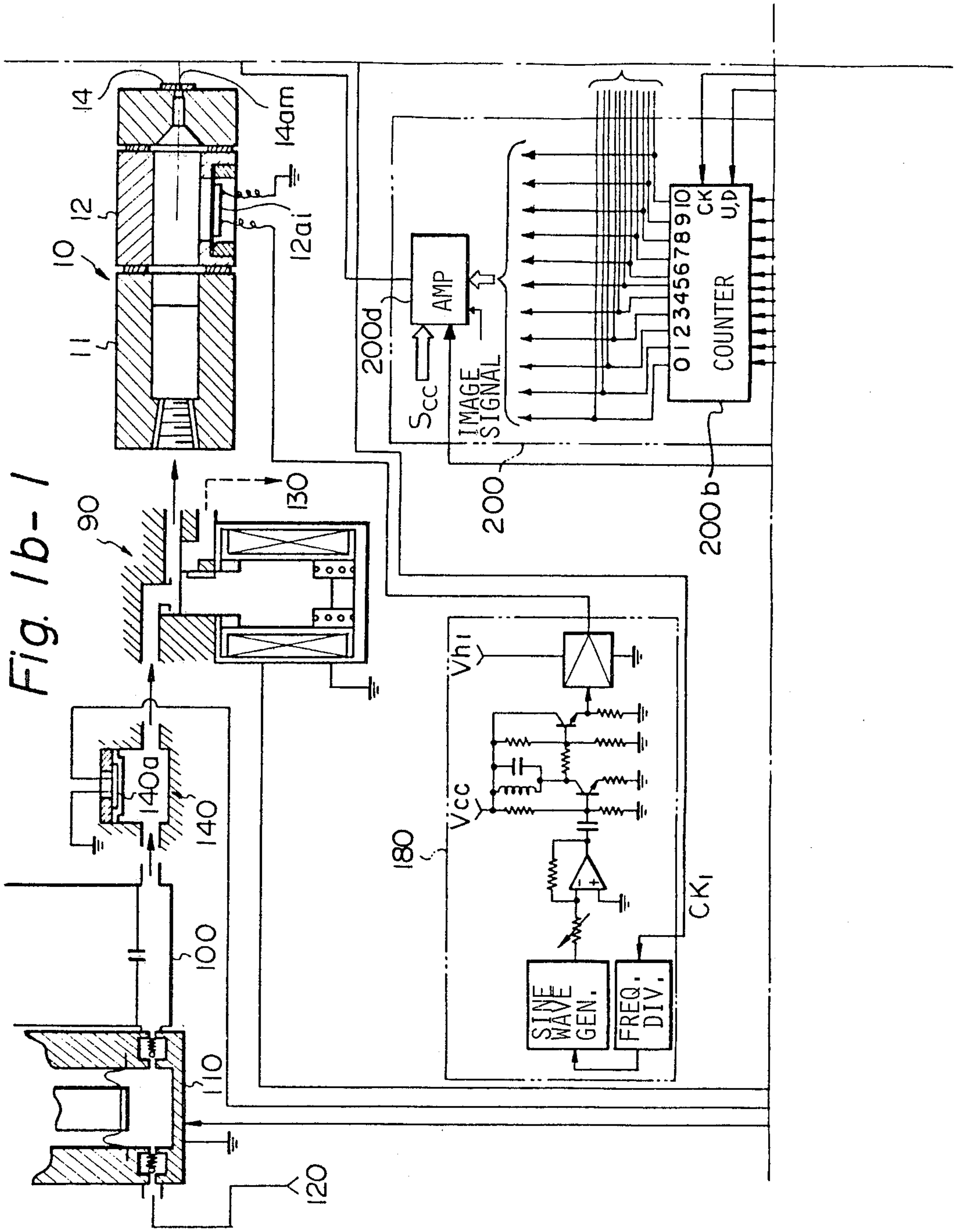
FIGS. 1*b*, 1*b*-1 to 1*b*-4 is a block diagram indicating an electric circuit arrangement associated with the mechanical arrangement shown in FIG. 1*a;*
Figures 1, 1B, 2:
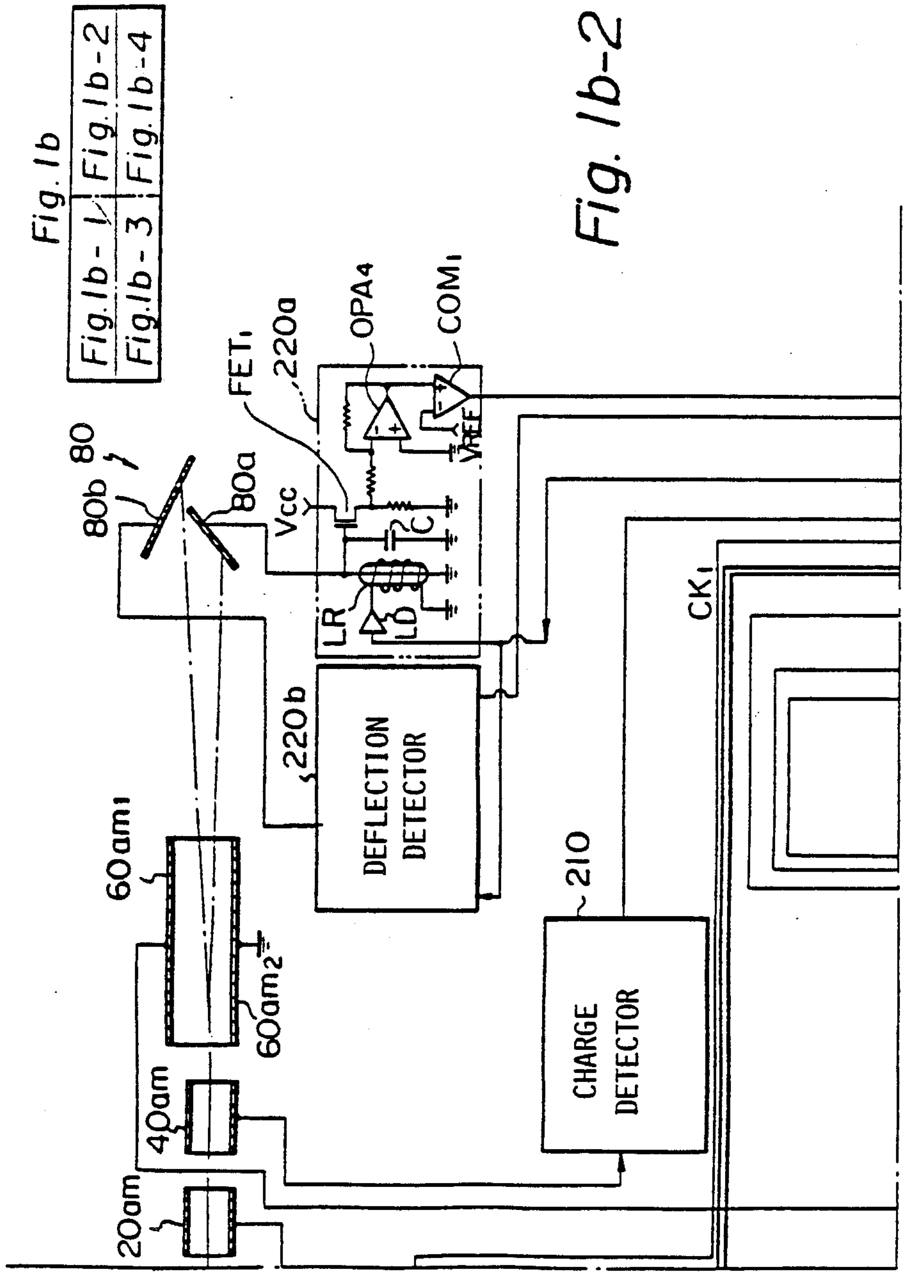

Referring to FIG. 1*a* of the drawing, there is shown the mechanical arrangement of a multi-nozzle type multi-value deflection ink jet recording apparatus to which the present invention is applicable. FIGS. 1*b* and 1*c* show major electric arrangements of the ink jet recording apparatus individually. The mechanical arrangement includes an ink ejection head 10 which is generally made up of a member 11 defining a common ink passage therein, a vibrator support frame 12 defining a drive space therein and a nozzle plate holder 13. The support 12 carries a plurality of electrostrictive vibrators $12a_i$ rigidly on its bottom wall. When the vibrators $12a_i$ are driven synchronously with a constant frequency, pressurized ink within the space of the support 12 will be applied with pressure oscillation of a determined frequency. The nozzle plate holder 13 is formed with a plurality of ink passageways $13a_i$ at common intervals (e.g. 5 mm) throughout its recording width, the passageways $13a_i$ communicating with the internal space of the support 12. A nozzle plate 14 is bonded to a surface of the holder 13 and provided with microscopic holes $14a_i$ at locations spaced the same distance as the ink passageways $13a_i$. The nozzle plate 14 has forty-two such holes $14a_i$ for ink ejection arranged at a common interval of 5 mm, so that one ejection head can record through the width of $42 \times 5$ mm $= 210$ mm. Besides these holes $14a_i$, the nozzle plate 14 has an additional hole at a position outside the recording area to eject droplets of ink therefrom in the same way as from the other holes.

A charging electrode plate 20 is located in front of the nozzle plate 14 with respect to the intended direction of ink ejection from the latter. In front of the electrode plate 20, there is positioned a charge detecting electrode plate 40 via the intermediary of a shield plate 30. A deflecting electrode unit 60 is positioned in front of the electrode plate 40 via a second shield plate 50. A gutter 70 is positioned in front of the electrode unit 60. The electrode plates 20 and 40 and shield plates 30 and 50 have aligned inverted U-shaped recesses which are common in number to the holes $14a_i$ of the nozzle plate 14. The electrode plates 20 and 40 individually have printed electrodes $20a_i$ and $40a_i$ on the inner surfaces of their inverted U-shaped recesses. Each of these electrodes $20a_i$ and $40a_i$ extends out individually along the surface of the electrode $20a_i$ or $40a_i$. The deflecting electrode unit 60 has a plurality of deflecting electrode plates $60a_l$ each of which is deposited with deflecting electrodes by evaporation on the front and back surfaces thereof. The deflecting electrodes on each electrode plate $60a_l$ are connected to first and second conductive wires 61 and 62, respectively.

The gutter 70 has upright capturing members or catches $70a_l$ at spaced locations where droplets of ink ejected from the holes $14a_i$ of the nozzle plate 14 and left non-charged (at a non-recording level) reach as indicated by dot-and-dash lines in FIG. 1*a*. While the catches $70a_l$ are shown in the illustrated embodiment to have one-to-one positional correspondence with the holes $14a_i$ of the nozzle plate for ejecting recording droplets, an electrode unit 80 for detecting deflection position is located within a range which ink droplets from a monitoring ejection hole $14a_m$ of the nozzle plate 14 will reach (outside the recording sheet area). The charging electrodes $20a_i$ are supplied with a staircase voltage waveform which may have forty stepwise or incremental variable levels, in accordance with image signals. Where a scan line is to be recorded or printed on a recording sheet for example, the 1st to 40th levels of voltage pulses will be coupled to the charging electrodes $20a_i$ in correspondence with the forty ink droplets ejected from the individual holes of the nozzle plate so as to charge the ink droplets to the 1st to 40th levels. These charged ink droplets will then be deflected by electric fields across the deflecting electrodes 60 from a high voltage power supply 230 and impinge on the recording sheet by way of the 1st to 40th deflecting paths and spacing between the catches $70a_l$. Thus, one ink ejection hole $14a_i$ is used to print forty dots along the array of the catches $70a_l$ (this direction will hereinafter be referred to as a horizontal scan or X-X direction). A recording sheet designated PR in the drawing is moved continuously or intermittently in a direction Y-Y which is perpendicular to the direction X-X mentioned. Since the application of charging voltages is controlled in accordance with image signals and since the recording sheet PR is fed in the manner stated, data will be recorded on the recording sheet PR in both the X-X and Y-Y directions in the form of dots.

An accumulator 100 supplies the head 10 with pressurized ink through an electromagnetic valve 90 and is in turn supplied with ink under pressure from an ink reservoir 130 through a filter 120. Ink captured by the gutter 70 is routed back to the reservoir 130. The fluid passage between the accumulator 100 and valve 90 has a member 140 which defines a fluid chamber 140 therein and carries a semiconductive strain gauge 140*a* sealingly therewith. The valve 90 has a first or inlet port communicated with the member 140, a second or outlet port communicated with the member 11, and a third port communicated with the interior of the ink reservoir 130.

The valve 90 is of the type having a plunger (not shown) which will recede when the coil of the valve is energized so as to provide communication between the inlet and outlet ports while blocking the third port. When the coil is deenergized, the plunger of the valve 90 will be advanced by the action of a coil spring to a position where it closes the inlet port and communicates the outlet port with the third port. The reference numeral 110 denotes a pump which comprises a single electric coil (not shown), a plunger in the form of a polarized permanent magnet, a diaphragm and a spring-biased ball valve. The electric coil will be supplied with a current alternately in opposite directions such that the plunger is driven for reciprocation to such and discharge ink alternately. The amount of ink delivery from the pump 110 depends on the switching frequency of the current supply thereto as well as the value of the current.

The electrode unit 80 includes a pair of charge detecting electrodes 80*a* and 80*b* which define at one end an opening wide enough to catch all the ink droplets from the monitoring ejection hole whatever the amount of deflection may be and, at the other end, a slit permitting only those droplets passed through a specific path to get therethrough. The specific path is in the embodiment a reference path of ink droplets which, concerning the 40 step charging, have been charged to the highest or 40th level of charge. These electrodes 80*a* and 80*b* are held integrally by a support 80*d* but electrically insulated from each other thereby.

Reference will be made to FIG. 1*b* for describing a fluid control section adapted to perform on-off fluid control and pressure control and a print control section for the search of charging phases and deflection amount control.

A fluid control section comprises a valve driver (amplifier) 150, a pressure setting circuit 160 and a pump drive and control circuit 170. When the central controller 240 supplies the valve driver 150 with a valve open command (for communicating input and output ports of the valve and energizing the coil) as its "1" level output, the coil of the valve 90 is supplied with a predetermined level of current to open the valve. The pressure setting circuit 160 is made up of a standard code setter 160*a*, an up-down counter 160*b* and a digital-to-analog converter 160*c*. The standard code setter 160*a* which is of the fixed or semi-fixed type is loaded with a code corresponding to the standard ink pressure.

When one count pulse arrives at the up-down counter 160*b* which has been supplied with an upcount command "1" or a downcount command "0", the counter 160*b* produces a code indicative of a number given by adding "1 (one)" to the output code of the standard code setter 160*a*. The counter 160*b* holds said code unless a count pulse arrives thereat. The output code of the counter 160*b* is processed by the digital-to-analog converter 160*c* into an analog signal and passed therefrom to the pump drive and control circuit 170.

Besides this analog signal from the converter 160*c* indicating a set pressure, the pump drive and control circuit 170 is supplied with an analog signal from the semiconductive strain gauge 140*a*. This analog output of the strain gauge 140*a* is high or low in level when the pressure of ink is high or low, respectively. In the circuit 170, the voltage at the strain gauge 140*a* is inverted and amplified by an operatinal amplifier $OPA_1$ while the analog signal from the digital-to-analog converter 160*c* is inverted and amplified by another operational amplifier $OPA_2$. Outputs of these operational amplifiers $OPA_1$ and $OPA_2$ are commonly coupled to a differential amplifier DAM. Supposing that the operational amplifier $OPA_1$ is producing an output voltage $V_1$ (inversely proportional to the ink pressure) which is $V_1 \geqq 0$ and the operational amplifier $OPA_2$ an output voltage $v_2$ (inversely proportional to the set pressure) which is $v_2 \geqq 0$, the differential amplifier DAM produces an output voltage $V_3$ which is $V_3 = K(v_1 - v_2)$. Therefore, the output voltage $V_3$ of the differential amplifier DAM will become lower as the actual ink pressure rises and as the designated pressure level drops while becoming higher as the actual ink pressure drops and as the designated pressure level rises. Only at a certain predetermined level of the voltage $V_3$, a switch SW in the form of a relay or a switching semiconductive element for instance is closed to supply the inverting input terminal of a third operational amplifier $OPA_3$ with a 50 Hz sinusoidal wave which constitutes a pump drive signal. Suppose here that the voltage $V_2$ appearing from the operational amplifier $OPA_2$ is constant. Then the output voltage $V_3$ of the differential amplifier DAM is proportional to the output voltage $V_1$ of the operational amplifier $OPA_1$ and therefore inversely proportional to the ink pressure. The switch SW closes when the ink pressure is lower than a predetermined level and opens when it rises beyond the predetermined level, the pump 110 being driven only when the switch SW is open. In this way, the ink pressure is controlled to the predetermined constant level. The pressure designating signal $V_2$ is applied to the differential amplifier DAM as a reference signal for the above-mentioned constant voltage control and which shifts in inversely proportional relation with the designated pressure level. Accordingly, the ink pressure will be controlled to a first constant pressure $P_0$ in response to a given designated pressure level $V_0$, to a second constant pressure $P_h (>P_0)$ in response to a designated pressure level $V_h$ higher than the level $V_0$, and to a third constant pressure $P_l (<P_0)$ in response to a designated pressure level $V_l$ lower than the level $V_0$. While the switch SW is in its closed state, transistors $Tr_1$ and $Tr_2$ are alternately turned on in synchronism with the positive and negative halfwaves of the 50 Hz sinusoidal wave whereby the coil of the pump 110 is alternately and repeatedly energized in opposite directions. That is, it is only when the switch SW is closed that the pump 100 is activated. As an alternative technique for the ink pressure control, the pump 110 may have its energizing frequency, pulse duration and/or current level controlled in accordance with the output level of the differential amplifier DAM.

The reference numeral 180 designates a driving voltage generator serving to drive the electrostrictive vibrators 12*a*$_i$. The central control device 240 supplies the drive voltage generator 180 with clock pulses $CK_1$. The drive voltage generator 180 subjects the input clock pulses $CK_1$ to $\frac{1}{4}$ frequency division and prepares a sinusoidal wave one cycle of which corresponds to two divided pulses. The sinusoidal wave is amplified within the drive voltage generator 180 and coupled therefrom to the electrostrictive vibrators 12*a*$_i$. One ink droplets shapes itself out of the ink column for each cycle of the sinusoidal wave. That is, one ink droplet appears for each eight clock pulses.

A phase setting circuit 190 of the print control section includes a counter 190*a* which is supplied with clock pulses $CK_1$. The counter 190*a* is a ring counter that upcounts the clock pulses $CK_1$ to "8" and counts "9" as "0". More specifically, while clock pulses $CK_1$ are arriving in succession, the counter 190*a* counts them as "0", "1", "2", . . . , "8", "0", "1", "2", . . . , "8", "0", "1", "2" . . . Output codes of this counter 190*a* are coupled to a decoder 190*b*. Accordingly, each time a clock pulse $CK_1$ arrives at the counter 190*a*, the decoder 190*b* shifts its high level or "1" output successively at its output terminals 0–7. Consequently, the individual output terminals 0–7 of the decoder 190*b* produce phase search pulses which have a common phase difference corresponding to the period $T_1$ of the clock pulses $CK_1$ relative to each other and have a duration of $T_1$ which is $\frac{1}{8}$ of a period $T_8$ of ink droplet production. These eight sets of phase search pulses are supplied to individual AND gates 0–7 of a first AND gate group $AG_1$ and also to paired OR gates 0–7 of an OR gate group $OG_1$, respectively, Outputs of the OR gates of the OR gate group $OG_1$ are fed to AND gates 0–7 of a second AND gate group $AG_2$. As will be described, during a phase search, all of the AND gates of the second group $AG_2$ are closed and selected one of the AND gates of the first group $AG_1$ is opened whereby a specific one of the phase search pulses or outputs at 0–7 of the decoder 190*b* is passed through an output OR gate $OR_1$ to a monitoring charge signal generator 200 which will be described hereinafter. Which one of the AND gates of the first group $AG_1$ is to be opened depends on the output of a second decoder 190*c* which is supplied with count codes of a second counter 190*d*. Clearing and upcounting of the second counter 190*d* are controlled by a central controller or central control device or unit 240. For a phase searching operation, the central control device 240 first clears the counter 190*d* so that the signal level at the output terminal 0 of the decoder 190*c* becomes high or "1". This opens the AND gate 0 of the first group $AG_1$ to deliver a phase search pulse appearing at the output terminal 0 of the decoder 190*b* to the monitor charge signal generator 200. For the duration of this phase search pulse, the charge signal generator 200 applies a charging voltage to a monitor charging electrode 20*$a_m$*. Observing the output of a charge detection circuit 210 which is connected to a monitor charge detecting electrode 40*$a_m$*, the central control device 240 supplies the counter 190*d* with one pulse if the output level of the charge detector 210 has not become "1" indicative of "charged" in a predetermined period of time after the clearing of the counter 190*d*. Then the signal level at the next output terminal 1 of the decoder 190*c* becomes "1" whereby the AND gate 0 of the first group $AG_1$ is closed and the AND gate 1 is opened to pass the second set of phase search pulses or output pulses at the terminal 1 of the decoder 190*b* to the charge signal generator 200 through the OR gate $OR_1$. It will be seen here that the pulses thus coupled to the charge signal generator 200 have a phase delay of $T_1$ relative to the preceding set of phase search pulses. Again, the central control device 240 observes the output level of the charge detector 210 and keeps on feeding pulses to the counter 190*d* until the output level becomes "1", causing the counter 190*d* to count up. When a "1" output indicative of "charged" is supplied from the charge detector 210 to the central controller 240, the latter supplies no more pulses to the counter 190*b* since an optimum charging phase has been determined. Then the central controller 240 supplies all of the AND gates 0–7 of the second group $AG_2$ with ON or "1" signals therefrom. Supposing that the count at the counter 190*d* existing at that instant is "3", the signal level at the output terminal 2 of the decoder 190*c* is "1" opening the AND gate 2 of the first group $AG_1$ and the AND gate 2 of the second group $AG_2$. A third set of phase search pulses are therefore supplied from the AND gate 2 of the group $OG_1$ to the OR gate $OR_1$ while an output of the OR gate 2 of the group $OG_1$ which is the combination of phase search pulses of the second and fourth sets is coupled to the OR gate $OR_1$. Stated another way, if it is the third set of phase search pulses that corresponds to the optimum charging phase, the OR gate $OR_1$ supplies the charge signal generator 200 with a printing charge pulse which is the sum (logical sum) of a pulse of the third set and those of the second and fourth sets on opposite sides of the third set, or a pulse having the search setting pulse at its center and lasting a duration of $3T_1$ which is three times as long as the duration of said pulse. Making the duration of phase search pulses short and that of printing charge pulses long functions to detect a charging phase accurately through phase search and ensure positive charging for printing. It will be noted in FIG. 1*b* that the mechanical arrangement is shown with the monitor ejection hole 14*$a_m$* at the center and with the monitor charging electrode 20*$a_m$* and onward in sectional plan view.

As already described, the monitor charge electrode 20*$a_m$* is supplied with a charging voltage from the charge signal generator 200 as long as an output print charge pulse ("1" level) of the phase setting circuit 190 lasts. The charging voltage generator 200 comprises a standard code setter 200*a* having a minimum gain code therein, a counter 200*b* to be loaded with the minimum gain code and incremented sequentially from the minimum gain code, and an amplifier circuit 200*d*.

Details of the amplifier circuit 200*d* are indicated in FIG. 1*c*. As shown, the amplifier circuit 200*d* includes a latch $LA_1$ for storing a 40th step charge voltage code ($S_{cc}$ indicating a voltage $V_{c40}$), a digital-to-analog converter $DA_1$ for converting a charge voltage code into an analog voltage (40th step voltage $V_{c40}$), and an analog gate AG. Also included in the amplifier circuit 200*d* are an AND gate $AN_1$, an operational amplifier $OPA_5$, resistors $R_i$, $R_I$, $R_1$–$R_n$ and switching elements $S_1$–$S_n$ which in combination function to set an input impedance of the operational amplifier $OPA_5$. Further included in the amplifier circuit 200*d* are a decoder $DE_1$, an output transistor TR and a feedback resistor $R_f$. The latch $LA_1$ is adapted to always latch a code indicative of the 40th step reference charge voltage out of all the codes indicative of the 1st to 40th step reference charge voltages ($V_{c1}$–$V_{c40}$). The AND gate $AN_1$ is supplied with charge timing pulses $S_{ct}$ and image signals (always fixed to "1" since this circuit is a monitor circuit). Only when the charge timing pulses $S_{ct}$ or outputs of the OR gate $OR_1$ of the phase setting circuit 190 remain logical "1", the 40th step reference charge voltage $V_{c40}$ is coupled to the input resistor $R_i$. Meanwhile, the counter 200*b* is incremented from the standard code and its updated count is supplied to the decoder $DE_1$. This turns on switching elements $S_1$–$S_x$ corresponding in number to the input count code $x_c$ of the decoder $DE_1$, whereby resistors $R_1$–$R_x$ are connected in parallel with the input resistor $R_i$. The central control unit 240 controls loading the standard or minimum gain code in the counter 200*b* and incrementing the same counter.

It will be recalled that the electrode unit 80 comprises two combined electrodes 80*a* and 80*b*. The position of the electrodes 80*a* and 80*b* is such that the slit gap there-between aligns with a path which ink droplets charged by the monitor electrode $20a_m$ supplied with a reference charging voltage are to follow. Deflection detectors 220a and 220b are connected with the electrodes 80a and 80b, respectively.

The deflection detector 220a is made up of an integrating MOS FET (metal oxide silicone field effect transistor) $FET_1$, a capacitor C, an operational amplifier $OPA_4$, a comparator $COM_1$, a reed relay LR and a relay driver (amplifier) LD. When the relay driver LD of the deflection detector 220a is energized for a moment, the relay LR is temporarily closed causing the capacitor C to discharge or release its charge (resetting). Thereafter, when charged ink droplets come to impinge on the electrode 80a, the capacitor C is charged little by little upon impingement of each ink droplet and this charge voltage is converted into a voltage by the $FET_1$ and coupled to an operational amplifier $OPA_4$. The amplifier $OPA_4$ then amplifies the input voltage and applies its output to the comparator $COM_1$. A reference voltage Vref which is also coupled to the comparator $COM_1$ is in this embodiment set at a value lower than an output voltage of the operational amplifier $OPA_4$ which will appear after 256 droplets of ink carrying a standard charge impinge on the electrode 80a. Accordingly, by checking the output level of the circuit 220a upon appearance of 256 ink droplets after the temporary closing of the relay LR, the ink droplets can be determined as flying the determined deflection path if the output level is "1" indicating "charge detected". The other deflection detector 220b is constructed in the same way as the deflection detector 220a. Ink droplets flying a path of short deflection would impinge on the electrode 80a whereas those flying a path of excessive deflection would impinge on the electrode 80b. Therefore, deflected positions of ink droplets can be determined by checking the outputs of the deflection detectors 220a and 220b after closing the relays LR of the deflection detectors for a moment subsequently to the aforementioned phase searching operation and when the number of the clock pulses $CK_1$ counted up has reached $256\times8=2048$ for instance, that is, then 256 ink droplets have appeared. Initially, the standard code indicating the minimum gain is supplied to the amplifier circuit 200d to make its gain minimum. Then, the central controller 240 increments the counter 200b one by one from the instant the deflection detector 220a has produced an output "1" and the other deflection detector 220b an output "0", thereby increasing the gain step by step. If the output levels of the deflection detectors 220a and 220b turn into "0" and "1", respectively, the deflection of charged ink droplets will be adequate and they will be flying a reference deflection path of the 40th step to impinge on the electrode 80b just missing the electrode 80a. At this instant, the count code in the counter 200b represents an adequate gain. The central control device 240 stores the adequate gain code in the latch $LA_2$ of each charge voltage generator $200_i$ (i=-1–42) connected with a corresponding charging electrode $20a_i$.

Figures 1, 1B, 2, 3:
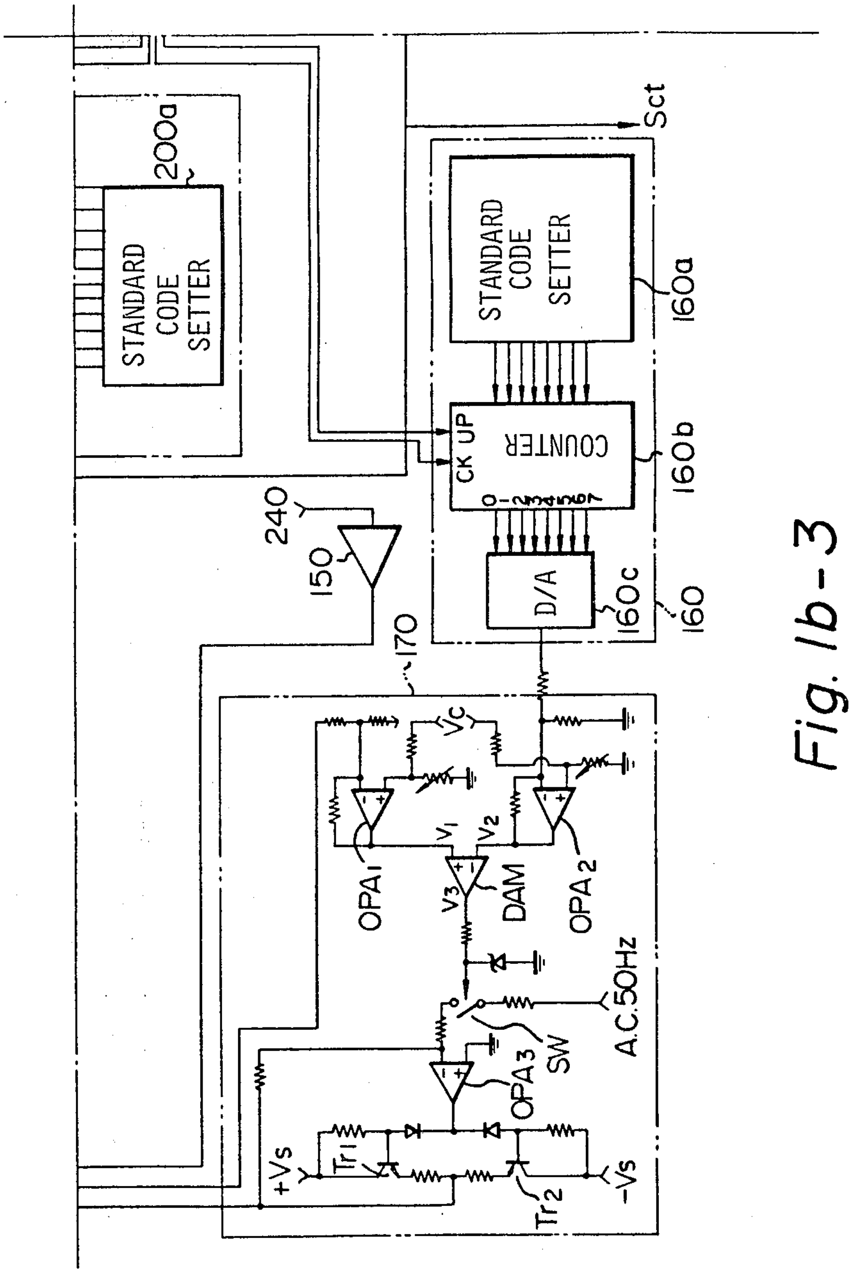
Figures 1, 1B, 2, 3, 4:
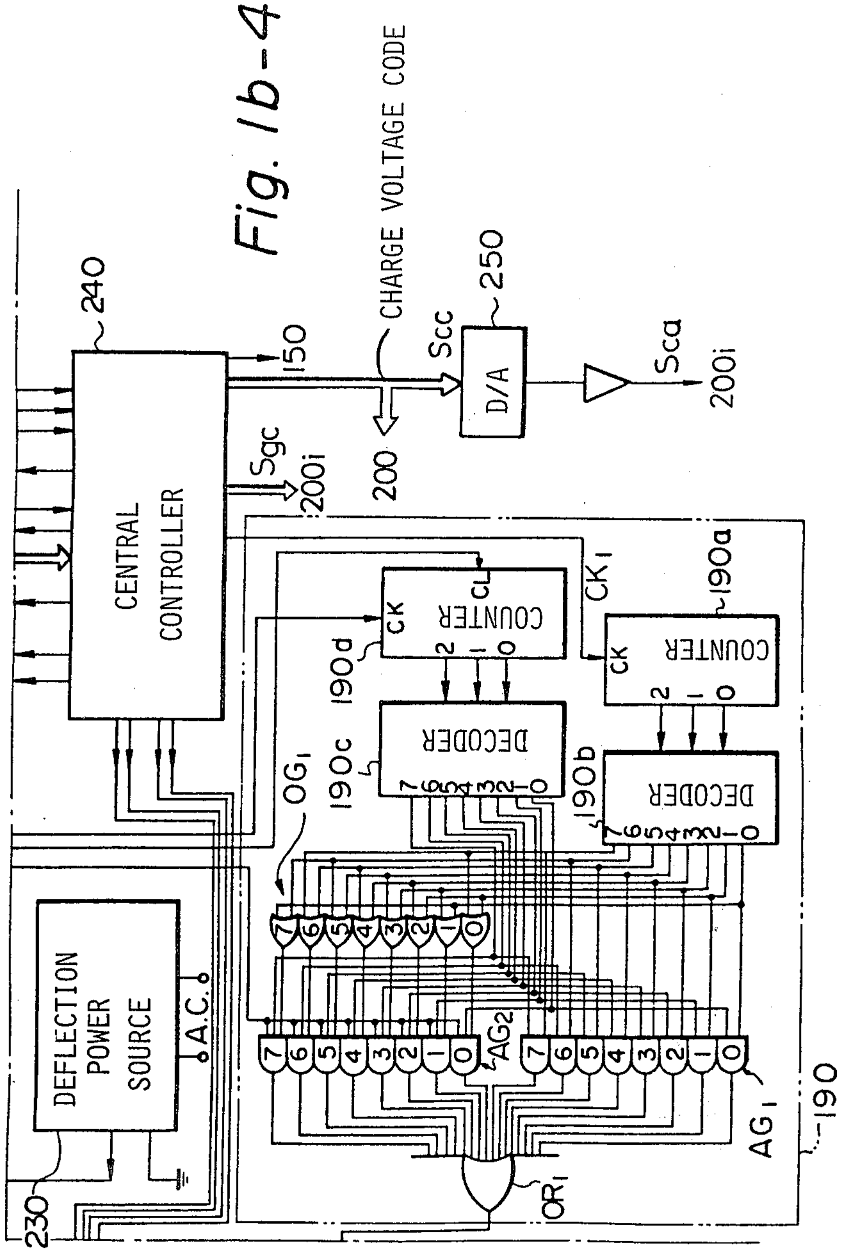
Figure 1C:
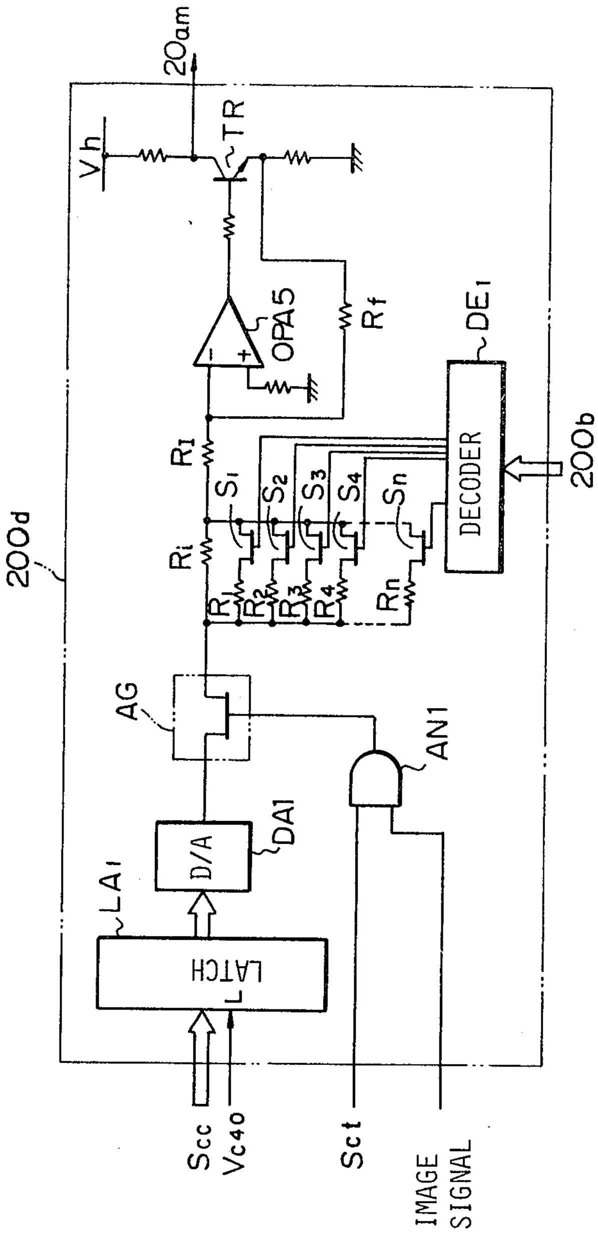
FIG. 1*c* is a block diagram showing a charge voltage amplifier.
Figure 1D:
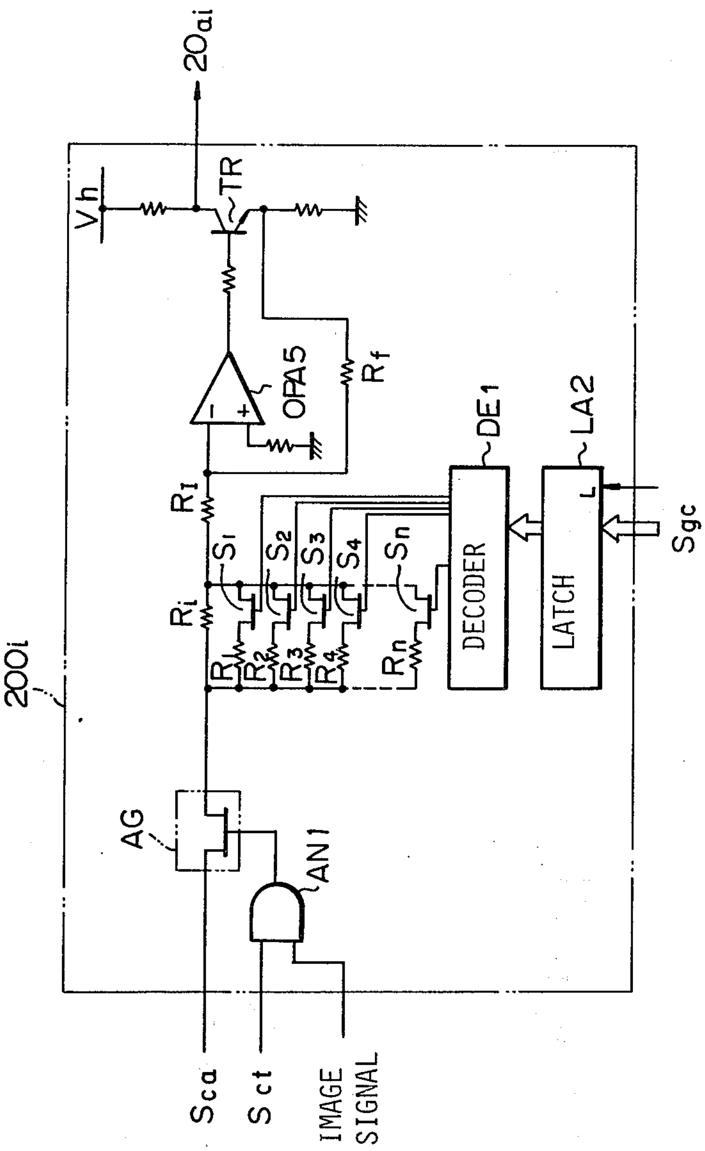
FIG. 1*d* is a block diagram showing a charge voltage generator.

The construction of a charge voltage generator $200_i$ is illustrated in FIG. 1d. The charge voltage generator $200_i$ is generally similar to the amplifier circuit 200d except that the latch $LA_1$ and digital-to-analog converter $DA_1$ are omitted while the analog gate AG is supplied with an output $V_{ca}$ (an analog voltage indicative of $V_{c1}$–$V_{c40}$) of a digital-to-analog converter 250 (FIG. 1b), and that the decoder $DE_1$ is supplied with an adequate gain code $S_{gc}$ from the latch $LA_2$. More specifically, the central control device 240 supplies the adequate gain code $S_{gc}$ to and stores it in the latch $LA_2$. In a printing operation, the central control device 240 supplies the analog gate AG of the charge voltage generator 200i with the first to 40th steps of charge voltages $V_{ca}$ ($V_{c1}$–$V_{c40}$) repeatedly in synchronism with the charge timing pulses $S_{ct}$, i.e. $V_{c1}$, $V_{c2}$, $V_{c3}$, . . . $V_{c40}$, $V_{c1}$, $V_{c2}$, $V_{c3}$ . . . $V_{c40}$, $V_{c1}$, $V_{c2}$, . . . Such voltages are coupled sequentially to the base of the output transistor TR after being amplified by an adequate gain. It should be noted that in the amplifier circuit 200d of FIG. 1c and the charge voltage generator of FIG. 1d the resistances of the resistors R are in a relation $R_1<R_2<R_3\ldots<R_n$. The amplifier $OPA_5$ has a gain G which is expressed as $$G=Rf/(R_i/R_x+R_j)$$

The input code of the decoder $DE_1$ designates specific one of the resistors $R_1$–$R_n$. Therefore, if a value indicated by an input code of the decoder $DE_1$ (gain designation code) is relatively large, one of the resistors $R_1$–$R_n$ having a correspondingly large resistance will be connected in parallel with the resistor $R_i$ to set a relatively large gain G.

Concerning the central control device 240, it comprises a central processing unit or CPU which may be constituted by a microprocessor, a semiconductive read-only memory or ROM, a semiconductive random access memory or RAM and a microcomputer of one or several chips having input/output ports (not shown). The read-only memory ROM stores therein program data for practicing the aforementioned various control, constant data which will be referred to for such programs, and other additional program and constant data. The central controller 240 controls printing operation in cooperation with an image signal processing control unit (not shown) on the image signal delivery side of the apparatus. Reference will now be made to the flowcharts shown in FIGS. 2a–2c for describing a part of the operation of the central controller 240 which is directly concerned with practicing the present invention.

The central control device 240 stores in its ROM codes of the reference charge voltages ($V_{c1}$–$V_{c40}$) from the 1st to 40th steps of deflection. Regions of the ROM storing such data will be referred to as "charge voltage memories 9–48" as indicated in Table 1. An irregular distribution, though insignificant, is unavoidable among the holes $12a_i$ concerning their ink ejection characteristics and also amoung the charging voltages $20a_i$ as to their charging characteristics. The ROM of the central control device 240 also stores gain compensatory coefficients to make up for any difference in the charge voltage levels to a monitor charge voltage level, which is attributable to the above-mentioned irregular characteristic distributions. Regions of the ROM storing these data will be referred to as "nozzle coefficient memories 1–42" as also indicated in Table 1.

It should be noted in Table 1 that the first charging level is indicated by no. 9, the second charging level by no. 10 and so forth up to the 40th charging level which is indicated by no. 48 (subtracting "8" from each of the numbers will provide a corresponding charging level).

The random access memory RAM of the central controller 240 has predetermined regions for temporary storage. These specific regions will be referred to as "registers" for convenience and, in relation with the flowcharts, they store contents shown in Table 2.

TABLE 1

| MEMORY REGIONS | | DATA STORED IN ROM CONTENTS |
|---|---|---|
| charge voltage memory | 9 | charge voltage $V_{c1}$ of 1st deflection step |
| | 10 | charge voltage $V_{c2}$ of 2nd deflection step |
| | 11 | charge voltage $V_{c3}$ of 3rd deflection step |
| | ⋮ | ⋮ |
| charge voltage memory | 48 | charge voltage $V_{c40}$ of 40th deflection step |
| nozzle coefficient memory | 1 | gain compensatory coefficient $\alpha_1$ for nozzle $14_1$ |
| | 2 | gain compensatory coefficient $\alpha_2$ for nozzle $14_2$ |
| | 3 | gain compensatory coefficient $\alpha_3$ for nozzle $14_3$ |
| | ⋮ | ⋮ |
| nozzle coefficient memory | 42 | gain compensatory coefficient $\alpha_{42}$ for nozzle $14_{42}$ |

TABLE 2

| MEMORY REGION | | READ/WRITE MEMORY DATA IN RAM CONTENT |
|---|---|---|
| TIMER 1 REGISTER | | count of CK1 for counting time |
| TIMER 2 REGISTER | | " |
| COUNTER 1 REGISTER | | " |
| COUNTER 2 REGISTER | | number of formed ink droplets (for deflection detection) |
| TIMER 3 REGISTER | | count of CK1 for counting time |
| CHARGE VOLT REGISTER 9 | Scc | charge voltage Vc1 actually applied to 200i for 1st deflection position |
| CHARGE VOLT REGISTER 10 | Scc | charge voltage Vc2 actually applied to 200i for 2nd deflection position |
| CHARGE VOLT REGISTER 11 | Scc | charge voltage Vc3 actually applied to 200i for 3rd deflection position |
| ⋮ | | ⋮ |
| CHARGE VOLT REGISTER 48 | Scc | charge voltage Vc40 actually applied to 200i for 40th deflection position |
| COEFFICIENT REGISTER | | proper gain code Sgc indicated by count code of counter 200b |
| COUNTER 4 REGISTER | | number of CK1 (for frequency division) |
| COUNTER 5 REGISTER | | number of formed ink droplets (for switching charge voltage) |

Figure 2A:
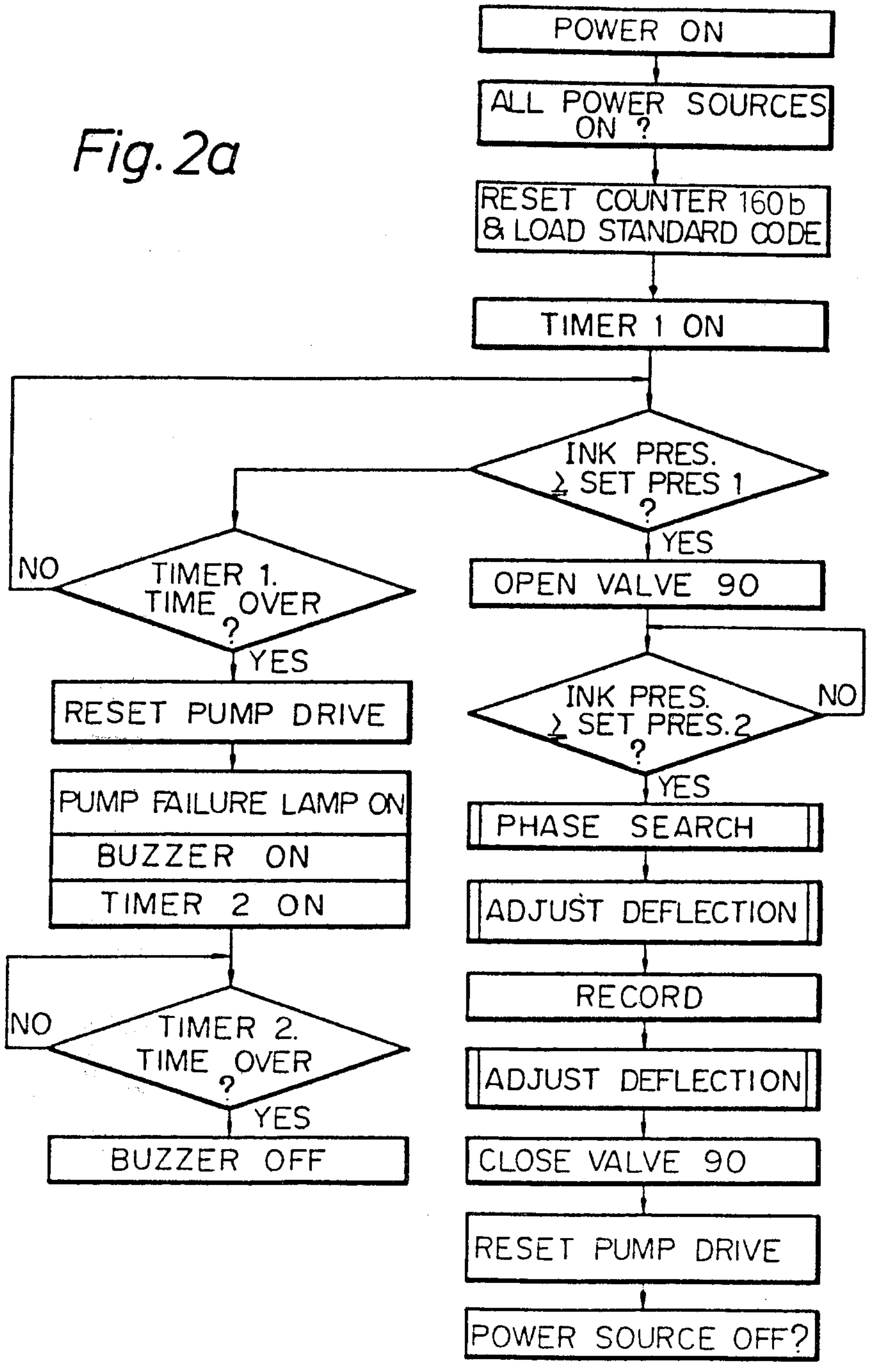
FIG. 2*a* is a flowchart outlining a control operation of a central control device from a step of power source application to the end of recording.

Referring now to FIG. 2*a*, the operation of the central control unit 240 will be outlined. When supplied with power itself, the central controller 240 turns on power sources of various instruments and circuits which it is to control (FIGS. 1*b*, 1*c* and 1*d*) in a predetermined sequence. The central controller 240 resets the counter 160*b* of the pressure setting circuit 160 and loads it with a standard code. This causes the pump driver 170 to activate the pump for establishing a standard ink pressure. After thus setting a target ink pressure at the standard level, the central controller 240 starts counting up the clock pulses $CK_1$. This is performed according to a count program which causes the controller to add "1" to the content of the timer 1 register every time a clock pulse $CK_1$ arrives and store the sum anew in the timer 1 register. During this action, the central controller 240 keeps on checking the output pressure of the semiconductive strain gauge 140*a*. When this pressure grows beyond the reference level 1, the central controller 240 activates the valve 90 to thereby provide communication between the accumulator 100 and ink jet head 10. If the ink pressure remains lower than the reference level 1, after the timer 1 register has reached the reference value or under a "time over" condition, the central controller 240 turns off the power sources for pump drive and control circuits and for printing actions while latching a failure indication lamp and a buzzer in their energized states. At the same time, the central controller 240 starts adding "1" to the timer 2 register in synchronism with the clock pulses $CK_1$ and storing the sums anew in succession (timer 2 ON). As the timer 2 register exceeds a predetermined count meaning "timer over", the buzzer is deenergized but the lamp is kept turned on. As already stated, then the ink pressure rises beyond the reference value 1 and the value 90 is opened, ink will be ejected from the head 10 resulting in a temporary drop of the ink pressure. To cope with this, the central controller 240 waits until the ink pressure exceeds a second reference level 2 and then performs phase search which is followed by adjustment of the amount of deflection. After the adjustment of the deflection amount, the central controller 240 informs the image signal delivery side of the end of preparation for recording operation and demands the supply of image signals. The central controller 240 in this way performs its actions for reproducing images on the recording sheet. During printing operation, the central controller 240 carries out phase search and adjustment of deflection amount in response to phase search commands and deflection adjustment commands which will be applied thereto from the image signal delivery side. Upon completion of the printing operation, the central controller 240 in response to an end command from the image signal delivery side first deenergizes the valve 90 and then turns off the power source associated with the pump drive and control circuit and then turns off the power sources for the other units and circuits (FIGS. 1a, 1b and 1c). The power source associated with the controller 240 proper is turned on and off by the image signal delivery side.

Reference will be made to the flowcharts of FIGS. 2b and 2c for describing in detail operations of the central controller 240 for searching a phase and adjusting a charging level.

Figure 2B:
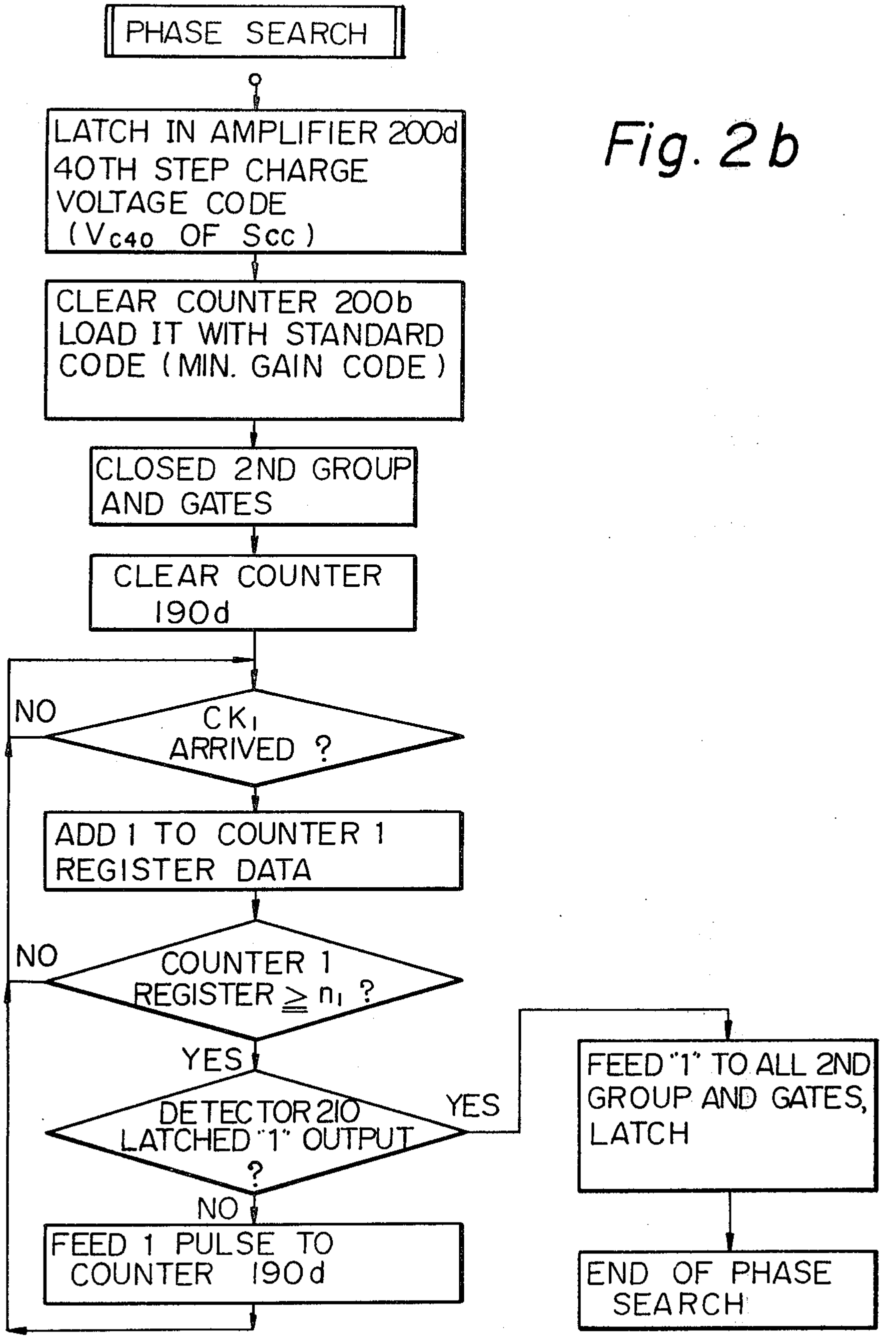
FIG. 2*b* is a flowchart demonstrating in detail the steps of phase searching and setting.

In a phase search, as demonstrated in FIG. 2b, the 40th step reference charge voltage code is latched in the latch $LA_1$ of the amplifier circuit 200d. The counter 200b is cleared and then loaded with the reference code (minimum gain code). Under this condition, all the AND gates 0–7 in the second group $AG_2$ are turned off (output latch of the central controller reset) to clear the counter 190d. This turns on or opens the AND gate 0 alone of the first group $AG_1$ so that only the first set of phase search pulses are coupled from the output terminal 0 of the decoder 190b to the monitor charge signal generator 200. Thereafter, the central controller 240 counts up clock pulses $CK_1$, that is, the counter 1 register stores a number of arrived clock pulses $CK_1$. As the number of the clock pulses exceeds predetermined one $n_1$, that is, after a predetermined number of ink droplets have been produced, the central controller 240 checks whether the output of the charge detector 210 is latched at "1". If not, it supplies the counter 190d with one pulse. At this instant, the output terminal of the decoder 190c producing the "1" output is shifted from 0 to 1. This causes the AND gate 1 of the first group $AG_1$ to produce the second set of phase search pulses (output terminal 1 of the decoder 190b) which are then supplied to the monitor charge signal generator 200. Upon the lapse of another predetermined period of time, the central controller 240 again checks the output level of the charge detector 210 and, if it is still "0", supplies another pulse to the counter 190d. In this manner, phase search pulses coupled to the monitor charge signal generator 200 are sequentially shifted by each period $T_1$ of clock pulses $CK_1$ within a period $T_8=8T_1$ of droplet production. If the output level of the charge detector 210 turns from "0" to "1" indicating "charged", the then updated code in the counter 190d will represent phase search pulses which adequately charge droplets. This completes a phase searching operation. Then, the central controller 240 turns on all the AND gates 0–7 of the second group $AG_2$. A printing charge pulse will then appear from the OR gate $OR_1$ with a duration three times as long as the duration $T_1$ of an adequate phase search pulse, i.e. $3T_1$, with the latter positioned at the midpoint.

Figures 1, 2C:
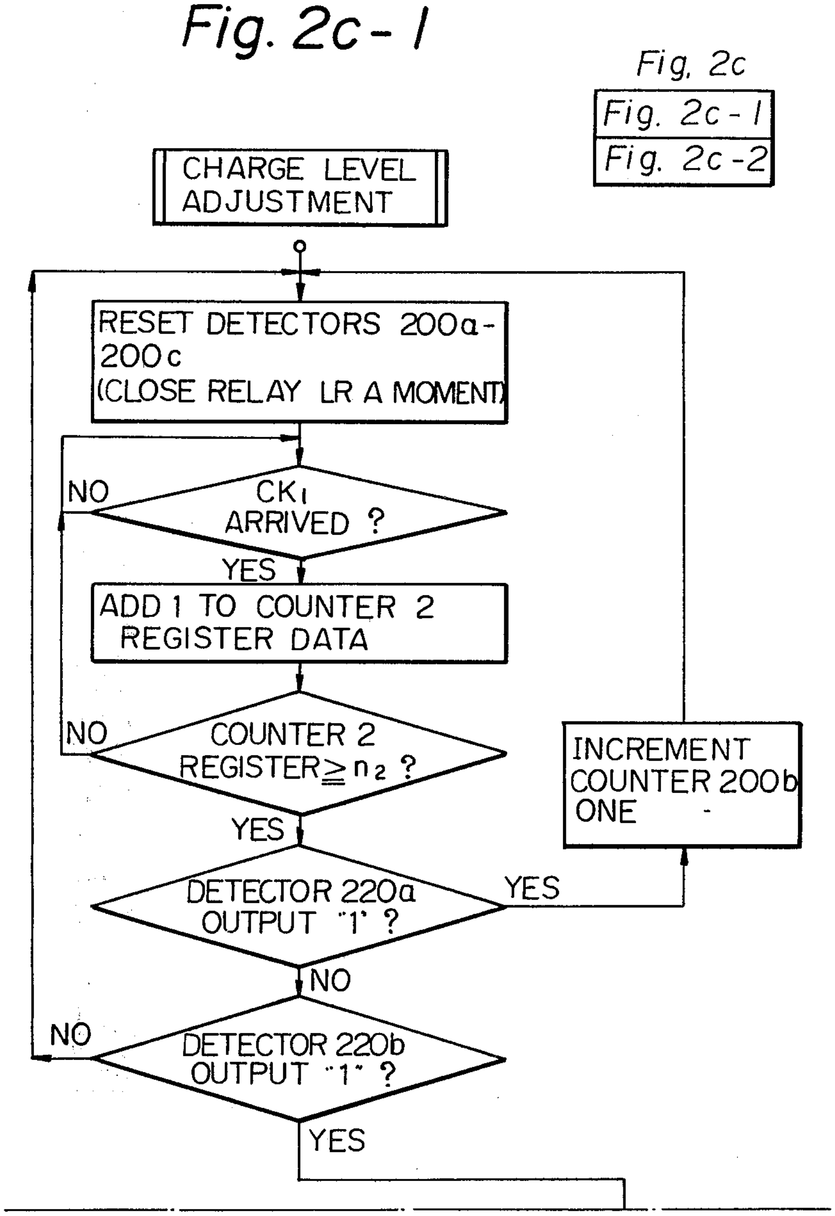
Figures 2, 2C:
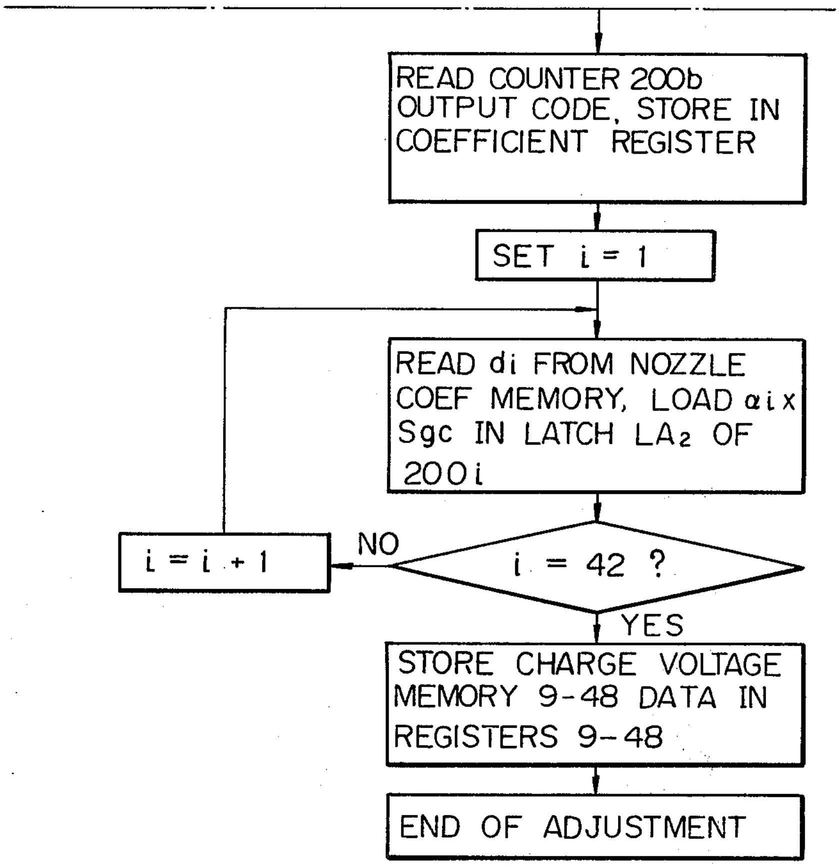
Figure 3:
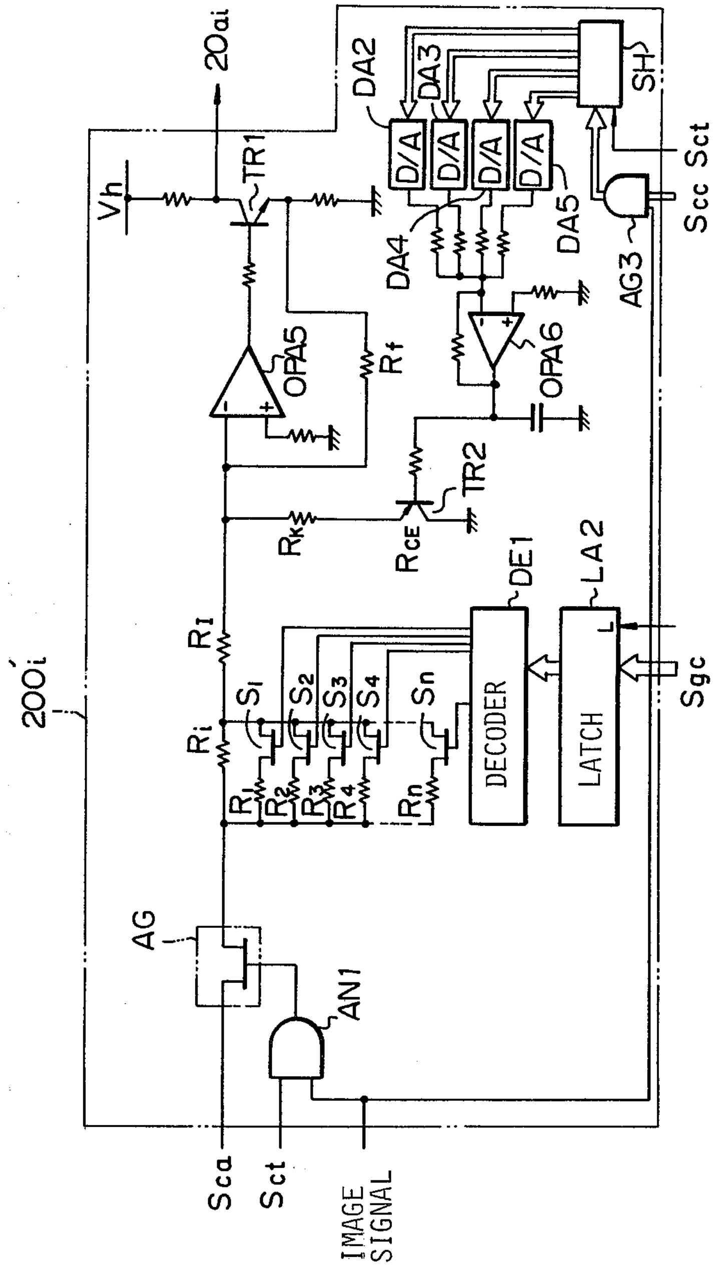

In adjusting the charging level, the central controller 240 first closes the reed relays LR of the deflection detectors 220a and 220b for a moment as demonstrated in the flowchart of FIG. 2c. This causes the capacitors C in the deflection detectors 220a and 220b to discharge or release their charges. The controller 240 then starts counting up ink droplets formed sequentially. Upon the increase of the count beyond predetermined one, the controller 240 checks output levels of the deflection detectors 220a and 220b. If the output level of the detector 220a is "1", the counter 200b is incremented by one with the deflection determined short. However, when the output of the counter 200b which will be checked by the controller 240 before incrementing the counter 200b is larger than a predetermined value $N_{ma}$, the controller 240 determines the situation to be lying out of the voltage level adjustable range. The counter 200b is cleared and loaded with a standard code again. At the same time, the counter 160b is conditioned for a down-count mode and supplied with one pulse to establish a one step lower target ink pressure one step lower than the previous pressure. The timer 3 register starts storing the number of arrived clock pulses $CK_1$ and thereby counts time. At the instant the data stored in the timer 3 register increase beyond a predetermined number (timer 3 time over), when the actual ink pressure is to show a change in response to the change of the target ink pressure, another phase searching operation is carried out as seen in FIG. 2b. After this second phase search, the controller 240 again closes the relays LR of the deflection detectors 220a and 220b for a moment and starts counting ink droplets formed in succession. When the count reaches predetermined one, the controller 240 checks the output levels of the detectors 220a and 220b. The counter 200b is incremented in this way as long as the detector 220a produces a "1" output, and the ink pressure is adjusted every time the count increases up to the reference count $N_{ma}$. Such a procedure will soon make the output level of the detector 200a "0" and that of the detector 220b "1". At this time, the counter 220b is stopped and its updated output codes $S_{gc}$ is stored in the coefficient register. Then the central controller 240 reads nozzle coefficients $\alpha_1$–$\alpha_{42}$ from nozzle coefficient memories 1–42 and stores a product $\alpha_i \times S_{gc}$ in the latch $LA_2$ of each charge voltage generator $200_i$ (i=1–42). The monitor charge voltage generator 200 and each print charge voltage generator 200 are thus provided with optimim gains, respectively. Subsequently, the central controller 240 writes the data $V_{c1}$–$V_{c40}$ of the charge voltage memories 9–48 in the charge voltage registers 9–48, respectively.

In a printing operation, the central controller 240 repeatedly supplies the digital-to-analog converter 250 with the data stored in the charge voltage registers 9–48 in a predetermined order in synchronism with charging timing pulses $S_{ct}$.

As will now be seen, the gist of the embodiment described hereinabove consists in detecting dislocation of deflected ink droplets relative to at least one reference deflection point, adjusting the gain of a charge amplifier circuit to reduce the dislocation substantially to zero, and automatically setting charge voltages for respective steps corresponding to the other deflection positions on the basis of the adjusted gain. This precludes computation which would otherwise be needed for all the steps of deflection, facilitating a simple and fast charge voltage setting operation.

Another possible form of the charge voltage generator is illustrated in FIG. 3. The charge voltage generator $200_i'$ of FIG. 3 is similar to the amplifier circuit 200d of FIG. 1c except that the latch $LA_1$ and digital-to-analog converter $DA_1$ are omitted while the analog gate AG is supplied with outputs/$V_{ca}$ of the digital-to-analog converter 250 (FIG. 1b), and that an adequate gain code $S_{gc}$ is coupled from the latch $LA_2$ to the decoder $DE_1$. Furthermore, the charge voltage generator $200_i'$ comprises a series connection of a resistor $R_K$ and a transistor $TR_2$ while an output voltage of the operational amplifier $OPA_6$ is coupled to the base of the transistor $TR_2$. This arrangement is employed to adjust the gain of the operational amplifier $OPA_5$ in response to charges on preceding charged ink droplets. A reference charge voltage code $S_{cc}$ is connected to a third group of AND gates $AG_3$ which correspond in number to the bits of the input code $S_{cc}$ though represented by a single AND gate in the drawing. When the image signal is logical "1" requiring a printing operation, reference charge voltage codes $S_{cc}$ are coupled through the AND gates $AG_3$ serially to a shift register SH and, therefrom, to digital-to-analog converters $DA_2$–$DA_5$ in parallel relation. The outputs of the digital-to-analog converters $DA_2$–$DA_5$ are weighted by adding resisters which connect to an operational amplifier $OPA_6$. The weighting is such that the newer the reference charge voltage code $S_{cc}$ is, the heavier the weight is. The operational amplifier $OPA_6$ inverts the input sum thereof and passes it to the base of the transistor $TR_2$. The latch $LA_2$ stores the aforementioned adequate gain code $S_{gc}$. The gain $G_i$ of the operational amplifier $OPA_5$ is expressed as $$G_i = \frac{R_f}{R_x/R_i + R_I} + \frac{R_f}{R_K + R_{CE}}$$

where $R_x$ denotes one of the resistors $R_1$–$R_n$ connected in parallel with the resistor $R_i$ and $R_{CE}$ denotes the resistance between the emitter and collector of the transistor $TR_2$. The resistance $R_{CE}$ corresponds in inversely proportional relation to the weighted sum of the outputs of the digital-to-analog converters $DA_2$–$DA_5$ so that the gain $G_i$ corresponds in proportional relation to the weighted sum of the outputs of the digital-to-analog converters $DA_2$–$DA_5$. Hence, the gain $G_i$ will be adjusted to a relatively large value when the number of preceding charged droplets is relatively large (up to four at the maximum) and their charges are thus relatively intense (up to a charge corresponding to the 40th step at the maximum). During printing operation, the central controller 240 supplies the analog gate AG of the charge voltage ganerator $200_i'$ repeatedly with the 1st to 40th steps of charge voltage signals $S_{ca}$ ($V_{c1}$–$V_{c40}$) in synchronism with the charge timing pulses $S_{ct}$, i.e. $V_{c1}$, $V_{c2}$, $V_{c3}$, . . . $V_{40}$, $V_{c1}$, $V_{c2}$, $V_{c3}$ . . . $V_{c40}$, $V_{c1}$, $V_{c2}$ . . . Digital codes $S_{cc}$ indicating charge voltage signals $S_{ca}$ are coupled to the AND gates of the third group $AG_3$. The signals $S_{ca}$ passed through the third AND gate group are amplified at an adequate gain and then supplied to the base of the transistor $TR_1$.

As in the previous embodiment, the resistances of the resistors $R_1$–$R_n$ in the amplifier circuit **200*d* of FIG. 1*c* or the charge voltage generator $200_i'$ of FIG. 3 are related as $R_1<R_2<R_3 \ldots <R_n$. The gain G' of the operational amplifier $OPA_5$ in the amplifier circuit 200*d*** is expressed as $$G' = Rf/(R_i/R_x + R_I)$$

Since an input code of the decoder $DE_1$ designates one of the resistors $R_1$–$R_n$, of the resistors $R_1$–$R_n$ having a comparatively large resistance will be connected in parallel with the resistor $R_i$ to set a relatively large gain G' or $G_i$ when the input code of the decoder $DE_1$ (gain designation code) indicates a relatively large value.

It will be seen from the above that the charge voltage generator $200_i'$ of FIG. 3 succeeds in precluding a distortion in the charge on a droplet regardless of an image signal distribution, because the gain is adjusted in accordance with a charge distribution pattern of the preceding charged droplets.

The foregoing embodiments employed a charge detecting electrode unit having two electrodes. Another embodiment of the present invention will be described with reference to FIGS. **4*a*–4*d* and 5*a*–5*c* in which the charge detecting electrode unit comprises three electrodes. The same parts and elements as those shown in FIGS. 1*a*–1*c*** will be denoted by the same reference numbers. The following description on this embodiment will concentrate to its difference from the foregoing embodiments.

The electrode unit 80' includes a pair of charge detecting electrodes **80*a* and 80*b* which define at one end an opening wide enough to catch all the ink droplets from the monitor ejection hole whatever the amount of deflection may be and, at the other end, a slit permitting only those droplets passed through a specific path to get therethrough. The specific path is in the embodiment a reference path of ink droplets which, concerning the 40-step charging, have been charged to the highest or 40th level of charge. The electrode unit 80' also includes a third charge detecting electrode 80*c* on which ink droplets passed through the slit between the electrodes 80*a* and 80*b* will impinge. These three electrodes 80*a*, 80*b* and 80*c* are held integrally by a support 80*d*** but electrically insulated from each other thereby.

A monitoring charge voltage generator 200' comprises a charge amplifier circuit **200*d*', an up-down counter 200*b*', a digital-to-analog converter 200*c*' and a reference gain code generator 200*a*'. In this embodiment, the reference gain code is one which causes ink droplets charged by a voltage determined by the product of the 40th step reference charge code and reference gain code to fly along the 40th step path, which is the largest in deflection of all the steps from the 1st to the 40th. The up-down counter 200*b*' is conditioned for an upcount mode or a downcount mode by the central controller 240. The output code of the counter 200*b*' indicating a value counted up or down from a value indicated by the reference gain code is supplied to the digital-to-analog converter 200*c*'. The output signal of the converter 200*c*' is coupled to the charge voltage amplifier 200*d*'** as a gain instruction signal.

Also coupled to the amplifier circuit **200*d*' are charge timing pulses $S_{ct}$ and a reference charge voltage (40th one of the charge voltage signals $S_{ca}$) which is an analog-converted version of a reference charge code (code indicative of the 40th one of the charge voltage signals $S_{cc}$). Details of the amplifier circuit 200*d*' are illustrated in FIG. 4*c***.

The amplifier circuit **220*d*' comprises a latch $LA_1$ for storing the 40th step reference charge voltage code $S_{cc}$, a digital-to-analog converter $DA_1$, an AND gate $AN_1$ producing a "1" output when the image signal is "1" for a pulse width of charge timing pulses, an analog gate AL opened by the "1" output of the AND gate $AN_1$ to pass a charge voltage $S_{ca}$ therethrough, a first gain control circuit $GC_1$, a second gain control circuit $GC_2$, an operational amplifier $OPA_5$ and an output transistor $Tr_1$. The gain control circuits $GC_1$ and $GC_2$ are adapted to control the gain between the input and output of the operational amplifier $OPA_5$ (between AL and $TR_1$). The gain control circuit $GC_1$ is supplied with an output voltage of the digital-to-analog converter 200*c*' and the gain control circuit $GC_2$ with a charge voltage $S_{ca}$. The first gain control $GC_1$ is made up of a resistor $R_K$ and a transistor $TR_2$ whose base is supplied with an output of the digital-to-analog converter 200*c*'**. The second gain control $GC_2$ on the other hand is made up of a series circuit of resistors and field effect transistors which are connected in parallel with the input resistor $R_i$, and a serial-in parallel-out analog shift register ASR. The shift register ASR stores charge voltages ($S_{ca}$) on ink droplets ahead of following one and shifts them in synchronism with charge timing pulses $S_{ct}$. The gain G" of the operational amplifier $OPA_5$ is expressed as $$G'' = \frac{R_f}{R_x/R_i + R_I} + \frac{R_f}{R_K + R_{CE}}$$

where $R_x$ denotes a composite resistance of resistances $R_1$–$R_n$ which in turn denote resistances of the serially connected resistors and field effect transistors connected in parallel with the resistor $R_i$, respectively. Since ink droplets ejected from the monitor ejection hole are constantly charged to the 40th step, it will be seen that the monitoring amplifier circuit 200*d'* may have the second gain control $GC_2$ omitted.

Figure 4A:
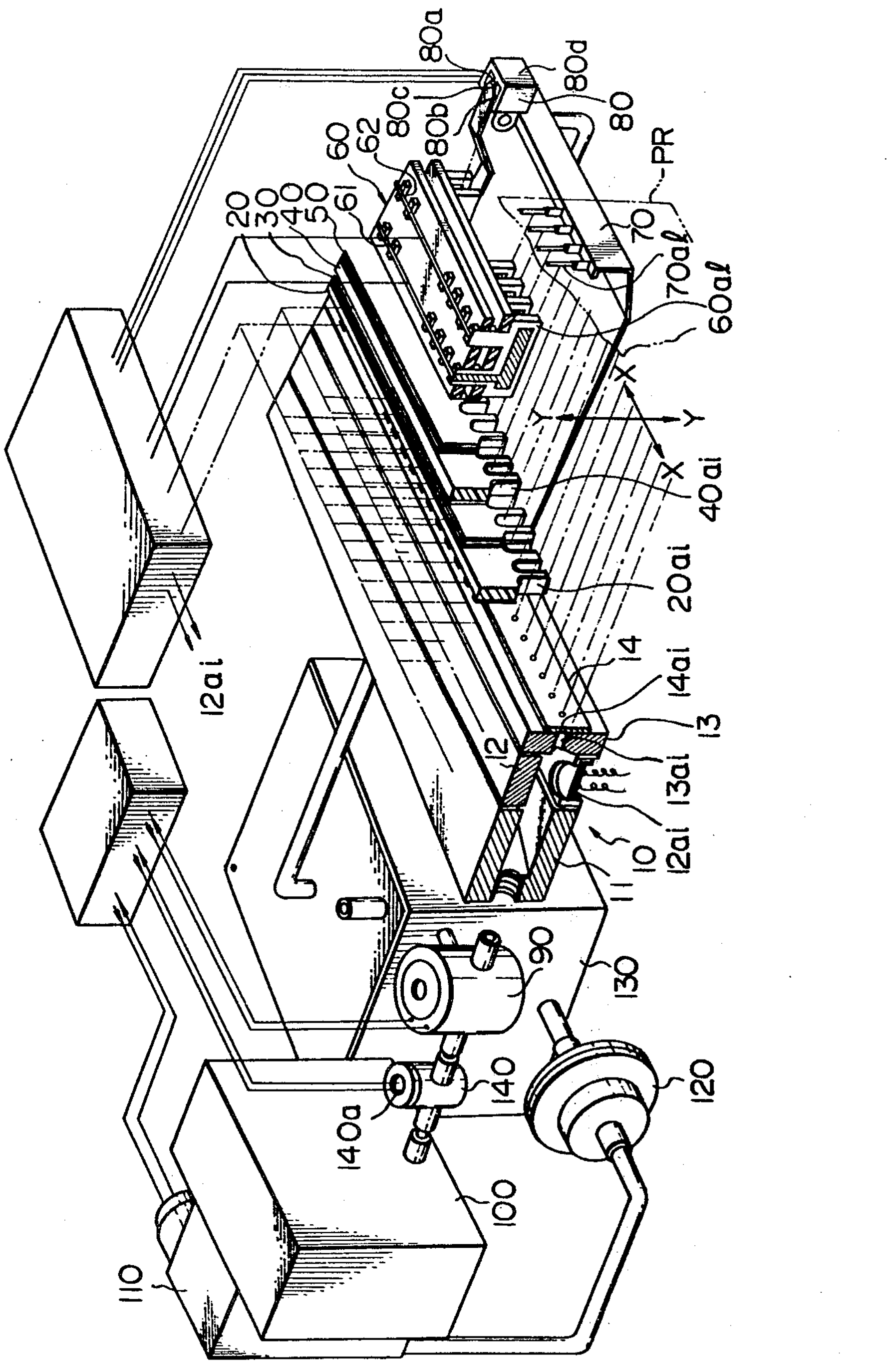
FIG. 4*a* shows in perspective form the mechanical arrangement of another embodiment of an ink jet printing apparatus of the present invention.
Figures 1, 4B:
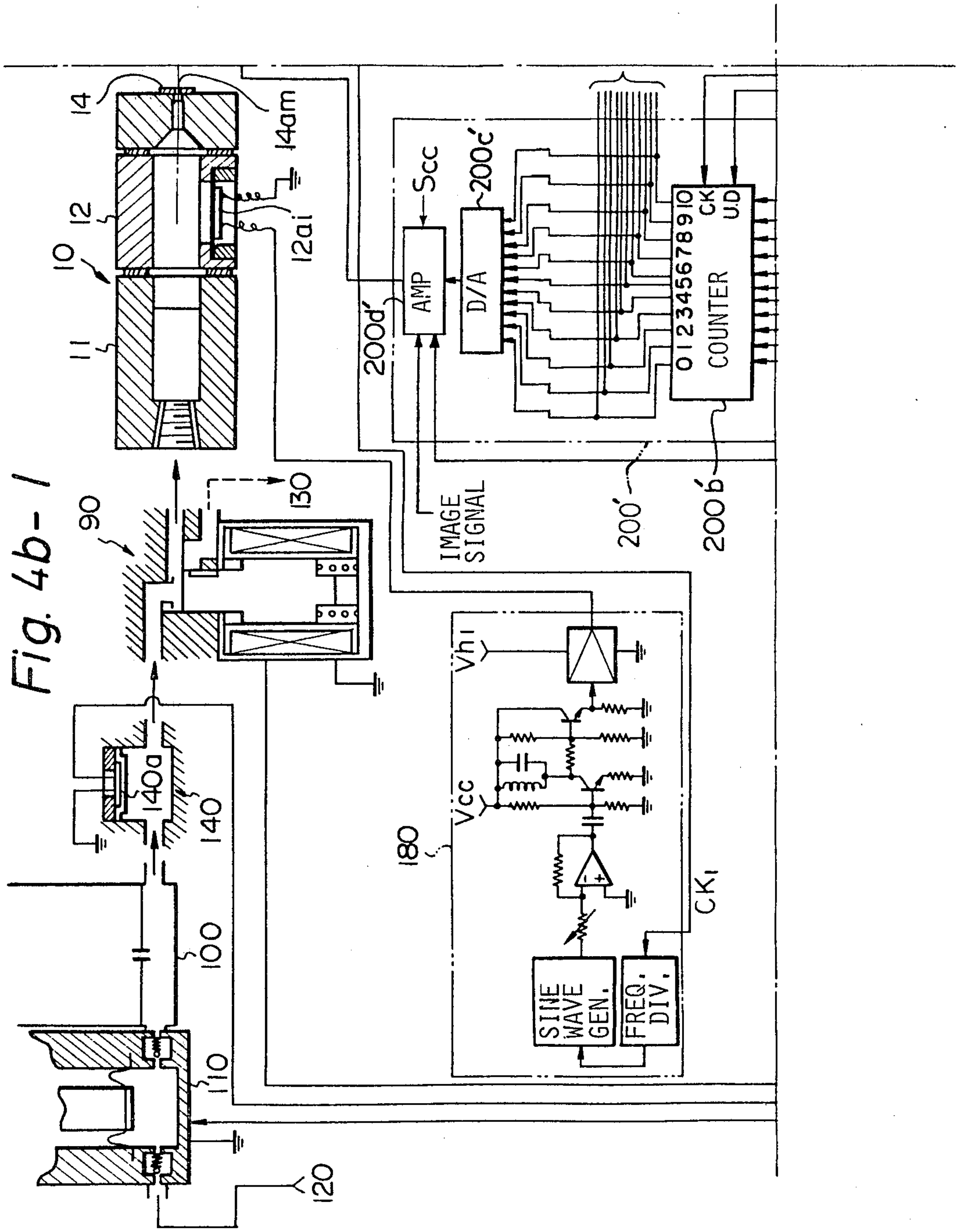
Figures 2, 4B:
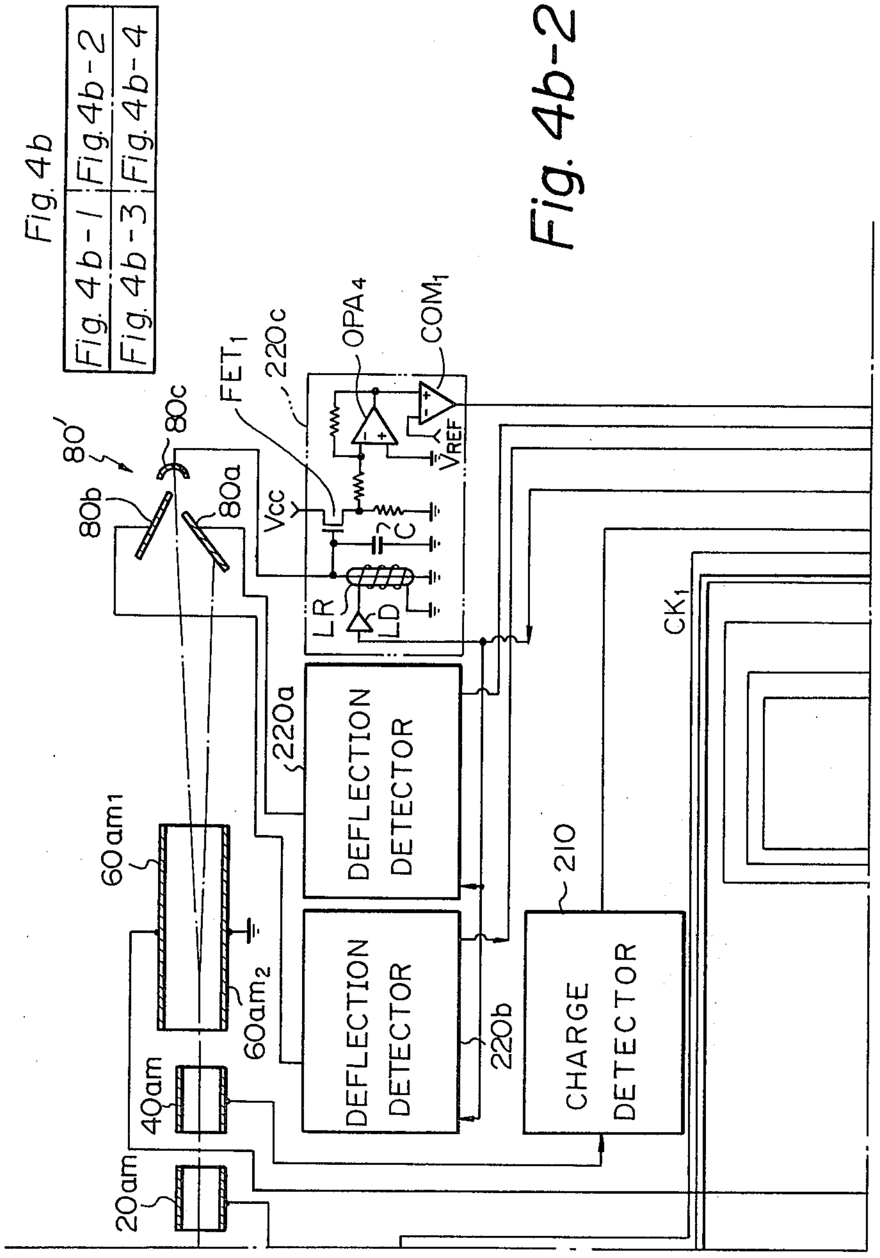
Figures 3, 4B:
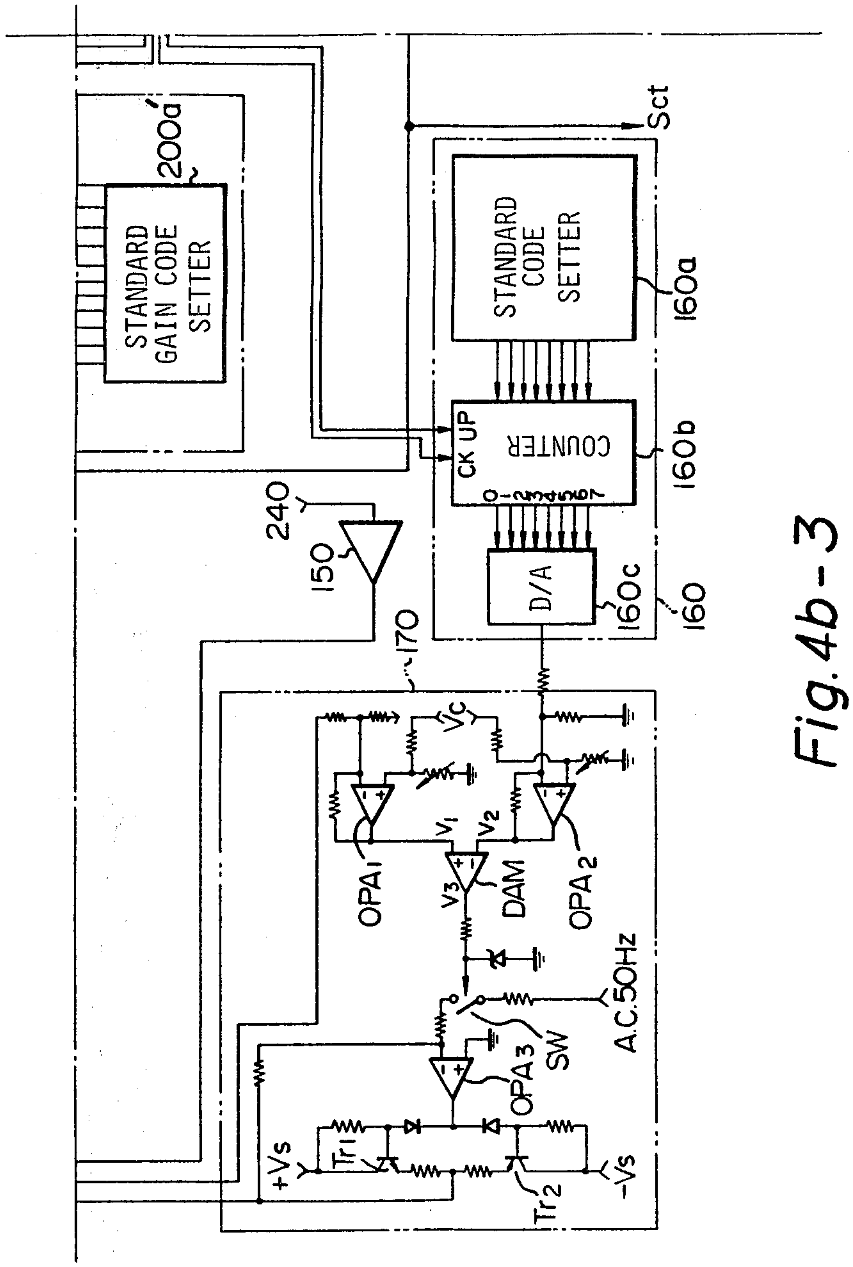
Figures 4, 4B:
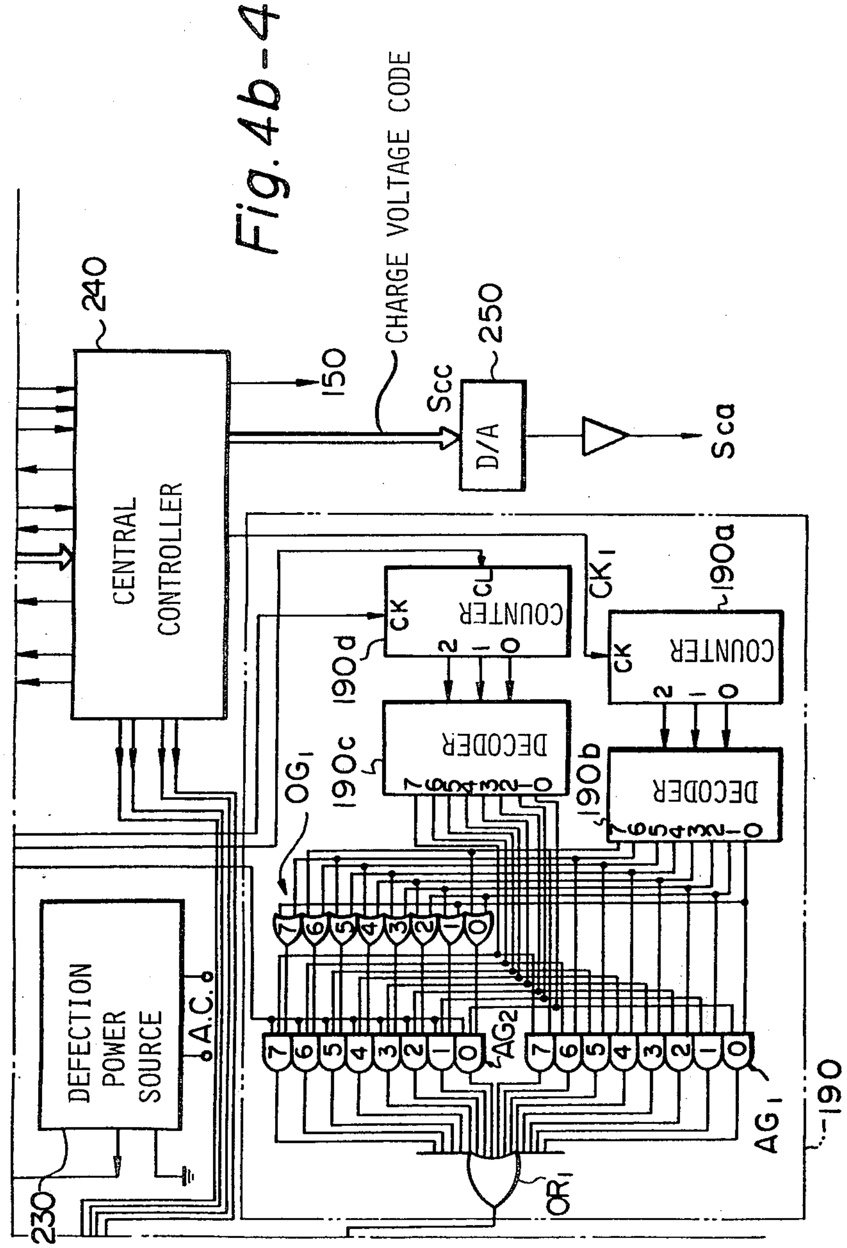
Figure 4C:
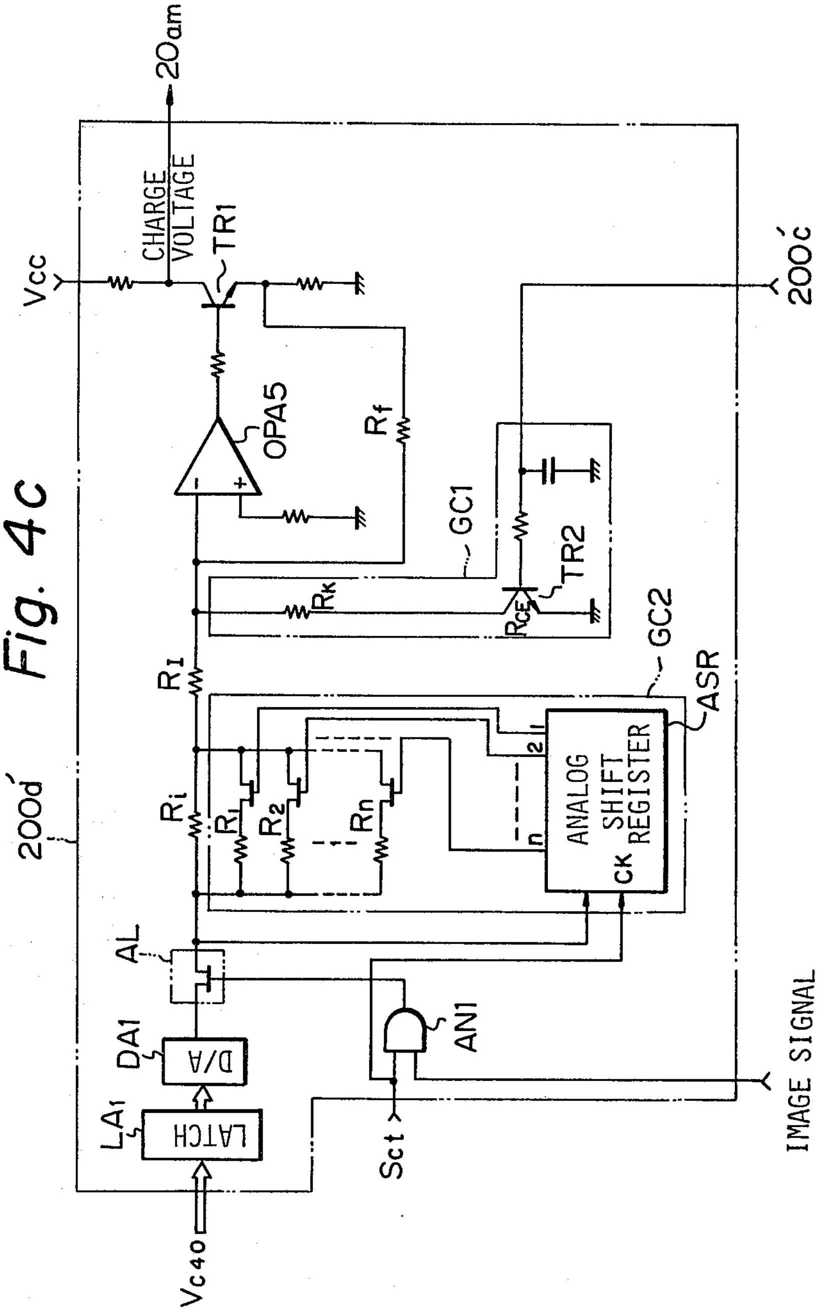
FIG. 4*c* is a block diagram showing a charge voltage amplifier.
Figure 4D:
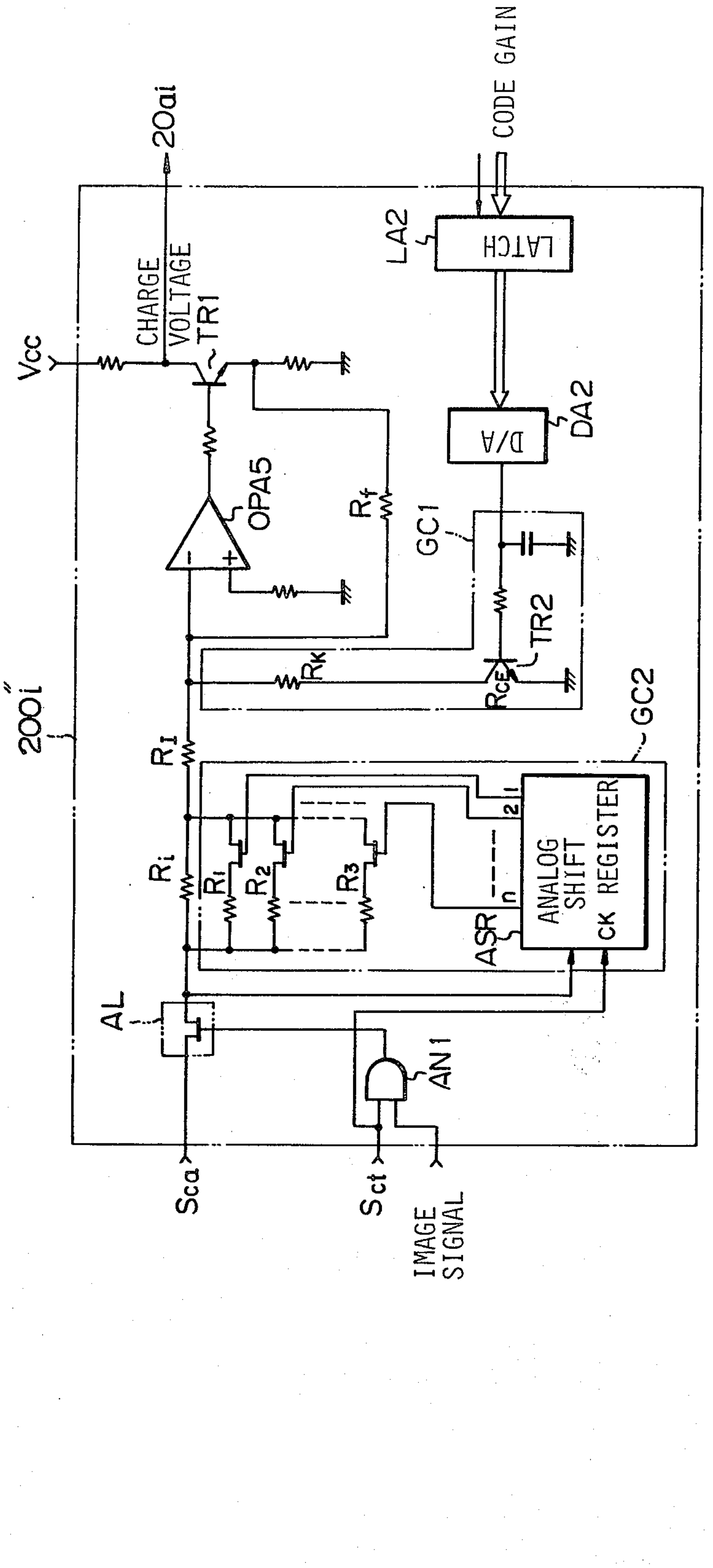
FIG. 4*d* is a block diagram showing a charge voltage generator.

FIG. 4*d* shows a printing charge voltage generator 200*i*" adapted to charge ink droplets ejected from a print ejecting hole 14*a*$_i$. This printing charge voltage generator 200*i*" differs from the monitoring charge voltage generator 200 in that the circuits 200*b'*, 200*c'* and 200*a'* are omitted, in that the analog gate AL is supplied with a charge voltage $S_{ca}$ (which varies cyclically from the 1st step to the 40th) provided by the digital-to-analog converter 250, and that the first gain control $GC_1$ is supplied via the digital-to-analog converter $DA_2$ and latch $LA_2$ with a gain designation code indicated by an output code of the counter 200*b*. The rest of the construction is essentially the same as that of the charge voltage amplifier 200*b* shown in FIG. 4*c*.

In FIGS. 4*a* and 4*b*, when the monitor charging electrode 20*a*$_m$ is supplied with a reference charge voltage which is dependent upon the reference charge voltage code (40th one of the reference charge voltage codes $S_{cc}$) and the reference gain code, the electrode unit 80' is so positioned that ink droplets charged by the reference charge voltage are to get through the gap between the electrodes 80*a* and 80*b* while the ink droplets passed through the gap are to impinge on the other electrode 80*c*. Deflection detectors 220*a*–220*c* are connected with the electrodes 80*a*, 80*b* and 80*c*, respectively.

The deflection detector 220*c* is, as shown in FIG. 4*b*, made up of an integrating MOS FET (metal oxide silicone field effect transistor) $FET_1$, a capacitor C, an operational amplifier $OPA_4$, a comparator $COM_1$, a reed relay LR and a relay driver (amplifier) LD. When the relay driver LD of the deflection detector 220*c* is energized for a moment, the relay LR is temporarily closed causing the capacitor C to discharge or release its charge (resetting). Thereafter, when charged ink droplets come to impinge on the electrode 80*c*, the capacitor C is charged little by little upon impingement of each ink droplet and this charge voltage is converted into a voltage by the $FET_1$ and coupled to an operational amplifier $OPA_4$. The amplifier $OPA_4$ then amplifies the input voltage and applies its output to the comparator $COM_1$. A reference voltage Vref which is also coupled to the comparator $COM_1$ is in this embodiment set at a value lower than an output voltage of the operational amplifier $OPA_4$ which will appear after 256 droplets of ink carrying a standard charge impinge on the electrode 80*c*. Accordingly, by checking the output level of the circuit 220*c* upon appearance of 256 ink droplets after the temporary closing of the relay LR, the ink droplets can be determined as flying the determined deflection path if the output level is "1" indicating "charge detected". The other deflection detectors 220*a* and 220*b* are constructed in the same way as the deflection detector 220*c*. Ink droplets flying a path of short deflection would impinge on the electrode 80*b* whereas those flying a path of excessive deflection would impinge on the electrode 80*b*. Therefore, deflected positions of ink droplets can be determined by checking the outputs of the deflection detectors 220*a*–220*c* after closing the relays LR of the deflection detectors for a moment subsequently to the aforementioned phase searching operation and when the number of the clock pulses $CK_1$ counted up has reached $256 \times 8 = 2048$ for instance, that is, then 256 ink droplets have appeared. If the output of the detector 220*c* is "1", the deflection is adequate; if the output of the detector 220*a* is "1", the deflection is short; and if the output of the detector 220*b* is "1", the deflection is excessive.

If the output level of the detector 220*a* is "1", the central control device 240 conditions the counter 200*b'* of the monitor charge voltage generator 200' for an upcount mode and supplies it with one pulse. If the output level of the detector 220*c'* is "1", the controller 240 conditions the same counter 200*b'* for a downcount mode and supplies it with one pulse. The controller 240 then temporarily closes and resets the relays of the deflection detectors 220*a*–220*c*. As the number of clock pulses $CK_1$ counted by the controller 240 coincides with predetermined one, the controller 240 again checks the output levels of the detectors 220*a*–220*c*. In this way, the central controller 240 causes the counter 200*b* to upcount or downcount until the output level of the detector 220*c* turns from "0" to "1", thereby adjusting the gain of the amplifier circuit 200*d'*. In detail, the output of the counter 200*b'* is coupled to the digital-to-analog converter 200*c'* so that the gain of the amplifier 200*d'* is adjusted by the output of the digital-to-analog converter 200*c'*. When the adjustment completes in response to the "1" output of the detector 220*c*, the then updated output code of the counter 200*b'* is stored in the latch $LA_2$ of a printing charge voltage generator 200*i*". The 1st to 40th steps of reference charge voltages $S_{ca}$ are repeatedly coupled in this order to the analog gate AL of the charge voltage generator 200*i*". Meanwhile, charge timing pulses $S_{ct}$ and image signals alotted to each ejection hole are coupled to the AND gate $AN_1$. As will be recalled, image signals are "1" level or "0" level when requiring printing or non-printing, respectively.

In adjusting and setting a charge level, the central controller 240 compares a count code of the counter 200*b'* with an upper limit and a lower limit which define a predetermined range, before causing it to upcount for downcount. If the count code coincides with the upper or lower limit, the central controller 240 resets the counter 200*b'* and loads it with the reference gain code. Then the controller conditions the counter 160*b* of the pressure setting circuit 160 for a downcount or upcount mode and feeds one pulse thereto to thereby vary the set ink pressure. After a time period long enough for the actual ink pressure to vary to the new reference level, the central controller 240 performs the phase search operation and then the operations for detecting a deflection and adjusting a charge level as already discussed.

Figure 5A:
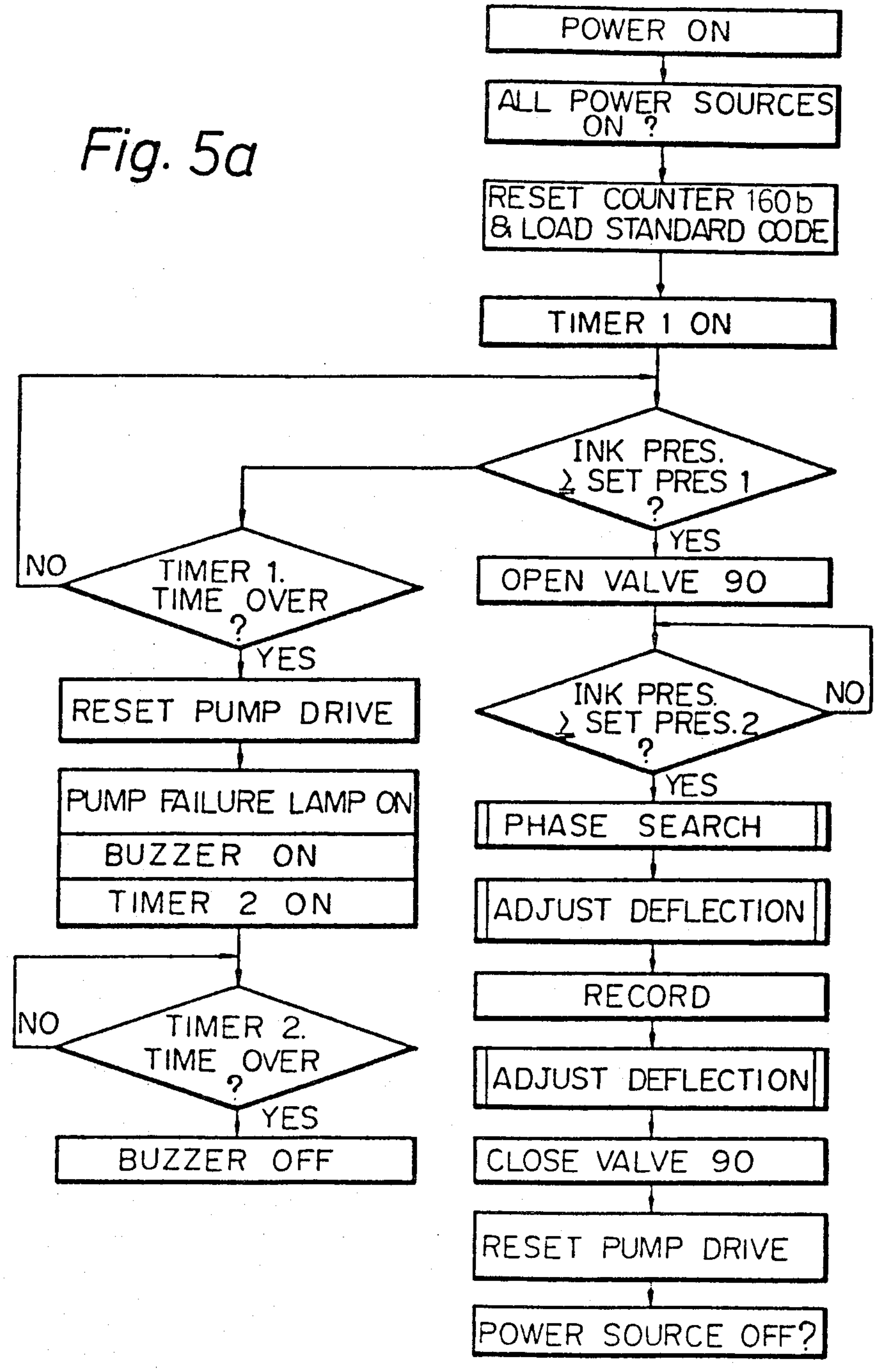
FIG. 5*a* is a flowchart outlining a control operation of a central control device from a step of power source application to the end of recording.
Figure 5B:
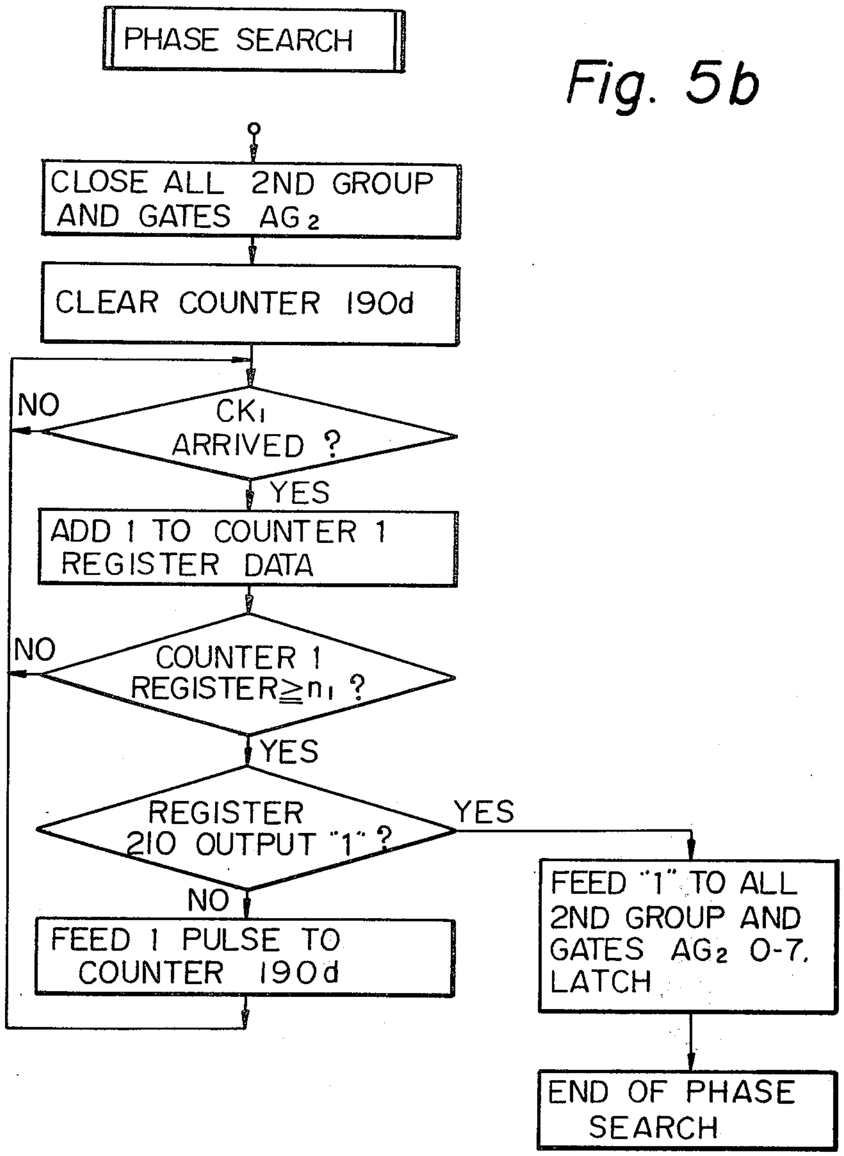
FIG. 5*b* is a flowchart demonstrating in detail the steps of phase searching and setting.
Figures 1, 5C:
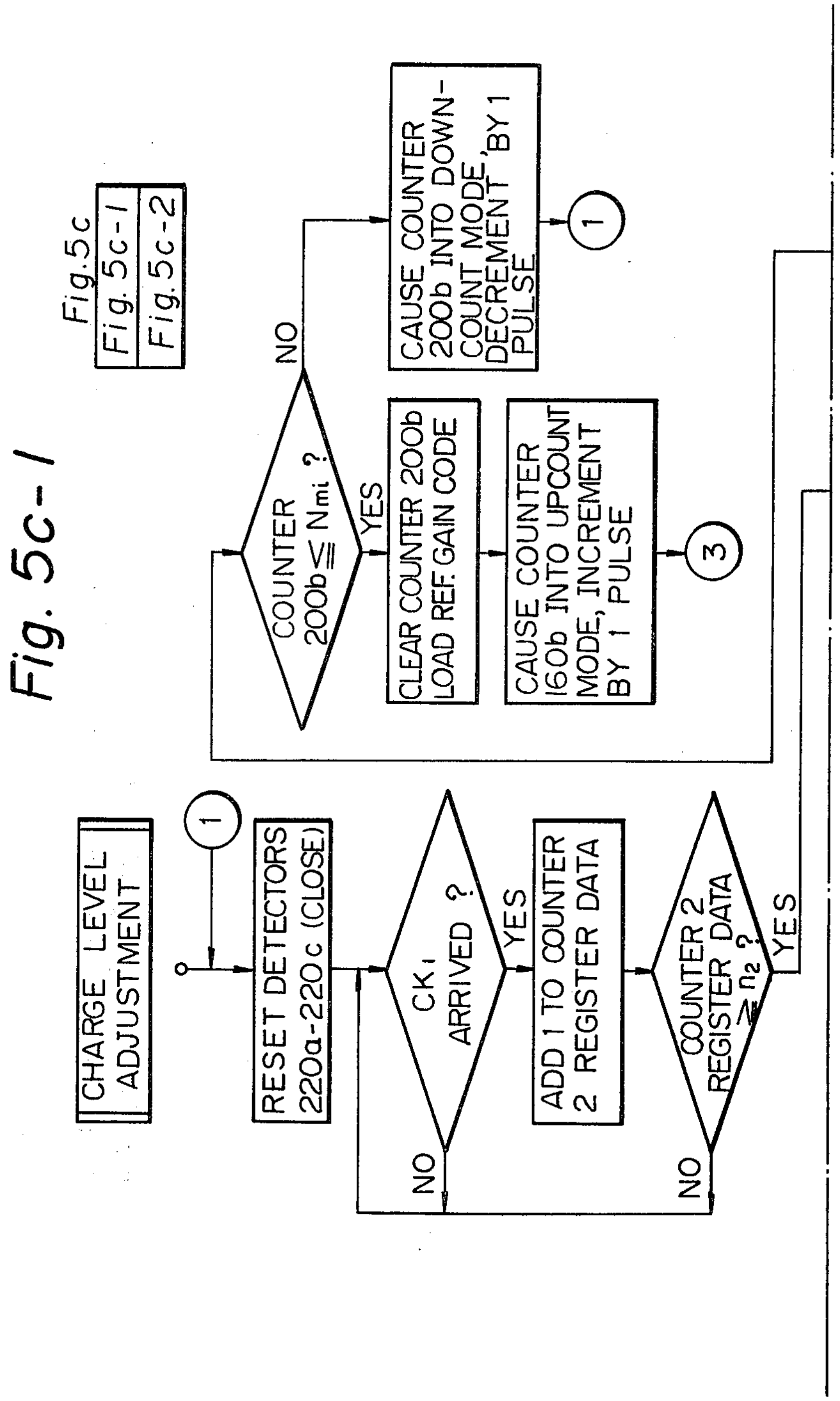
Figures 2, 5C:
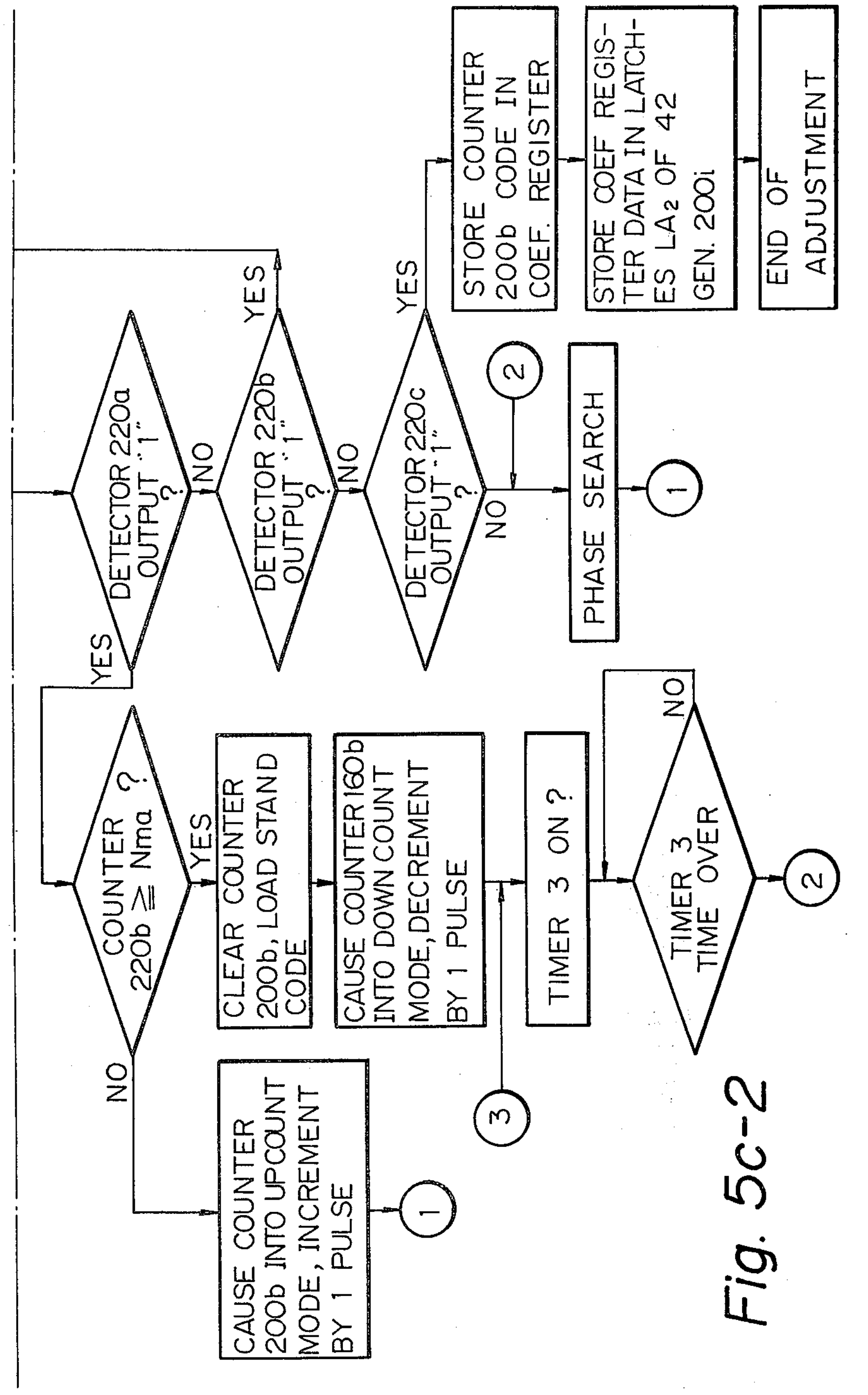

Referring now to FIGS. 5*a*–5*c*, there will be described operations of the central controller 240 which have direct connection with the embodiments of the present invention.

Referring now to FIG. 5*a*, the operation of the central control unit 240 will be outlined. When supplied with power itself, the central controller 240 turns on power sources of various instruments and circuits which it is to control (FIGS. 4*b* and 4*c*) in a predetermined sequence. The central controller 240 resets the counter 160*b* of the pressure setting circuit 160 and loads it with a standard code. This causes the pump driver 170 to activate the pump for establishing a standard ink pressure. After thus setting a target ink pressure at the standard level, the central controller 240 starts counting up the clock pulses $CK_1$. This is performed according to a count program which causes the controller to add "1" to the content of the timer 1 register every time a clock pulse $CK_1$ arrives and stores the sum anew in the timer 1 register. During this action, the central controller 240 keeps on checking the output pressure of the semiconductive strain gauge 140*a*. When this pressure grows beyond the reference level 1, the central controller 240 activates the valve 90 to thereby provide communication between the accumulator 100 and ink jet head 10. If the ink pressure remains lower than the reference level 1, after the timer 1 register has reached the reference value or under a "time over" condition, the central controller 240 turns off the power sources for pump drive and control circuits and for printing actions while latching a failure indication lamp and a buzzer in their energized states. At the same time, the central controller 240 starts adding "1" to the timer 2 register in synchronism with the clock pulses $CK_1$ and storing the sums anew in succession (timer 2 ON). As the timer 2 register exceeds a predetermined count meaning "timer over", the buzzer is deenergized but the lamp is kept turned on.

When the valve 90 is opened upon an increase in the actual ink pressure beyond the reference level 1 as mentioned, ink is ejected from the head 10 resulting in a momentary drop of the ink pressure. After the actual ink pressure has increased beyond a second reference level 2, the central controller 240 latches a code indicative of a voltage $V_{c40}$ in the latch $LA_1$ of the amplifier circuit 200*d'* and loads the counter 200*b'* with a reference gain code. Under this condition, the controller 240 carries out a phase search. Thereafter, the controller 240 supplies the second group of AND gates $AG_2$ with a gate on signal so as to adjust the deflection in the manner described (detection of a deflected position and adjustment of a gain). As ink droplets from the monitor ejection hole are found impinging on the electrode 80*a*, the central controller 240 stores the output code of the counter 200*b'* in the latch $LA_2$ of each print charge voltage generator 200*i''*. At the same time, the controller 240 supplies a print ready signal to the image signal delivery side and requests a supply of image signals. The central controller 240 turns itself to printing actions in this manner. During printing, the controller 240 sequentially changes the charge voltage code $S_{cc}$ to those indicating $V_{c1}$–$V_{c40}$ in synchronism with the charge timing pulses $S_{ct}$ and repeats this action. As a result, each print charge voltage generator 200*i''* is repeatedly supplied with voltages $V_{c1}$–$V_{c40}$ as signals $S_{ca}$ in this order while its AND gate $AN_1$ receives charge timing pulses $S_{ct}$ and image signals. Image signals are "1" level or "0" level when needing printing or non-printing, respectively, in accordance with an original image pattern; usually, the distribution is a serial random distribution of "0" and "1". When a "0" image signal appears, the AND gate $AN_1$ is closed to shut off the analog gate AL so that the operational amplifier $OPR_5$ produces a positive output. The transistor $TR_1$ is thus turned on at a high bias maintaining the voltage coupled to the charging electrode 20*a_i* low, whereby ink droplets are substantially prevented from being charged (to a level high enough to be deflected to a recording range). When the image signal level is "1" on the other hand, the analog gate AL is opened to pass a charge voltage $V_{ci}$ ($i=1$–$40$) therethrough to the operational amplifier $OPR_5$. Then the transistor $TR_1$ is turned on at a low bias coupling a high voltage corresponding to the charge voltage $V_{ci}$ to the charging electrode 20*a_i*. The thus formed charged ink droplets tend to lower a charge on an immediately following ink droplet due to their charges. To overcome this problem, the charge voltages $V_{ci}$ are stored in the shift register ASR and the parallel resistance $R_1$–$R_n$ to the resistance $R_i$ is lowered in correspondence with the charge voltages $V_{ci}$. This will increase the gain of the operational amplifier $OPA_5$ and thereby provide the subsequent droplet a sufficiently high output voltage.

It will be noted that the central controller 240 performs phase searching and deflection adjusting operations even during a printing period in response to commands which may be supplied thereto from the image signal delivery side.

As a printing operation is completed, the central controller 240 deenergizes the valve 90, then cuts off the pump drive and control 170 from the power supply, and then kills the power supplies to the other equipments and circuits (FIGS. 4*b* and 4*c*), all in response to an end of print signal from the image delivery side. The power supply to the controller itself is turned on and off by the image signal delivery side.

Reference will be made to the flowcharts of FIGS. 5*b* and 5*c* for describing in detail operations of the controller 240 for searching a phase and adjusting a charging level as well as those in the course of a printing period.

Referring first to FIG. 5*b*, in searching a phase, the central controller first latches a 40th step reference charge voltage code $V_{c40}$ in the latch $LA_1$ of the amplifier circuit 200*d'* and loads a reference gain code in the counter 200*b'*. Then, it sets all the AND gates 0–7 of the second AND gate group $AG_2$ in the phase setting circuit 190 to their off state (output latch of the central controller is reset) thereby clearing the counter 190*d*. This turns on or opens the AND gate 0 of the first group $AG_1$ so that only the first set of phase search pulses are coupled from the output terminal 0 of the decoder 190*b* to the monitor charge signal generator 200'. Thereafter, the controller 240 counts up clock pulses $CK_1$, that is, the counter 1 register stores a number of arrived clock pulses $CK_1$. As the number of the clock pulses exceeds predetermined one $n_1$, that is, after a predetermined number of ink droplets have been produced, the controller 240 checks whether the output of the charge detector 210 is latched at "1". If not, it supplies the counter 190*d* with one pulse. At this instant, the output terminal of the decoder 190*c* producing the "1" output is shifted from 0 to 1. This causes the AND gate 1 of the first group $AG_1$ to produce the second set of phase search pulses (output terminal 1 of the decoder 190*b*) which are then supplied to the monitor charge signal generator 200. Upon the lapse of another predetermined period of time, the controller 240 again checks the output level of the charge detector 210 and, if it is "0", supplies another pulse to the counter 190*d*. In this manner, phase search pulses coupled to the monitor charge signal generator 200' are sequentially shifted by each period $T_1$ of the clock pulses $CK_1$ within a period $T_8=8T_1$ of droplet production. As the output level of the charge detector 210 turns from "0" to "1" indicating "charged", the then updated code in the counter 190*d* will represent phase search pulses which adequately charge droplets. This completes a phase searching operation. Then the controller 240 turns on all the AND gates 0–7 of the second group $AG_2$. A print charge pulse will then appear from the OR gate $OR_1$ with a duration three times as long as the duration $T_1$ of the adequate phase search pulse, i.e. $3T_1$, with the latter positioned at the midpoint.

In adjusting the deflection, i.e., charging level, the central controller 240 first closes the reed relays LR of the deflection detectors 220*a*–220*c* for a moment as demonstrated in the flowchart of FIG. 5*c*. This causes the capacitors C in the detectors 220*a*–220*c* to discharge or release their charges. The controller 240 then starts counting up ink droplets sequentially formed. Upon the increase of the count beyond predetermined one, the controller 240 checks output levels of the detectors 220*a*–220*c*. If the output level of the detector 220*b* is "1", the counter 200*a'* is incremented by one with the deflection determined short. However, when the output of the counter 200*b'* which will be checked by the controller before incrementing the counter 200*b'* is larger than a predetermined value $N_{ma}$, the controller 240 determines the situation to be lying out of the voltage level adjustable range. The counter is cleared, and loaded with a reference gain code again. At the same time, the counter 160*b'* is conditioned for a downcount mode and supplied with one pulse to establish a one step lower target ink pressure. The timer 3 register starts storing the number of arrived clock pulses $CK_1$ and thereby counts time. At the instant the data stored in the timer 3 register increases beyond a predetermined number (timer 3 time over), that is, when the ink pressure is to show a change in response to the change in the target ink pressure, another phase search is carried out as seen in FIG. 5*b*. After this second phase search, the controller 240 again closes the relays LR of the detectors 220*a*–220*c* for a moment and starts counting ink droplets formed in succession. When the count reaches predetermined one, the controller 240 checks the output levels of the detectors 220*a*–220*c*.

When the output level of the detector 220*c* turns from "0" to "1", the controller 240 sets up a downcount mode of the counter 200*b'* and supplies one pulse thereto. However, if the count code of the counter 200*b'* which will be checked by the controller 240 before so conditioning the counter 200*b'* is less than a predetermined value $N_{mi}$, the controller 240 determines the situation to be lying out of the voltage level adjustable range. In this situation, the controller 240 clears the counter 200*b'*, loads it with a reference gain code again, conditions the counter 160*b* for an upcount mode and feeds one pulse thereto. The result is a target ink pressure one step higher than the preceding one. Then, the timer 3 register starts storing the number of arrived clock pulses $CK_1$ and thereby counts time. At the instant the change of the target ink pressure is reflected by a change of the actual ink pressure, that is, when the data stored in the timer 3 register increases beyond a predetermined number (timer 3 time over), another phase search is carried out as shown in FIG. 5*b*. After this second phase search, the controller 240 again closes the relays LR of the detectors 220*a*–220*c* for a moment and starts counting ink droplets formed in succession. When the count reaches predetermined one, the controller 240 checks the output levels of the detectors 220*a*–220*c*. When the detector 220*c* produces a "1" output indicating an optimum deflection, the output code of the counter 200*b'* is stored in the coefficient register and the stored content is memorized by the latch $LA_2$ of each of the forty-two printing charge voltage generators 200*i"*.

In the course of a printing operation, the central controller 240 sequentially supplies the digital-to-analog converter 250 with the codes stored in the charge voltage registers 9–48, i.e., codes indicative of the 1st to 40th steps of reference charge voltages $V_{c1}$–$V_{c40}$, timed to the formation of each ink droplet. After the code indicating the voltage $V_{c40}$, the code indicating the voltage $V_{c40}$ and onward will be delivered again.

Hereinafter will be described other embodiments and modifications of the present invention. To summarize the first embodiment shown in FIG. 1*a*, a multi-nozzle head is utilized which has 42 ink ejection holes at common spacings of 5 mm to cover the entire width of a recording sheet. Each ejection hole is used to record data over a range of 5 mm with 40 dots (8 dots per mm). The head also has a single ink ejection hole for monitoring calibrated to eject ink under the same conditions as the 42 recording holes. Ink from this monitoring hole is constantly charged by a voltage which deflects it to the maximum deflection position (the 40th step of charging voltage). The deflected position of monitoring ink droplets is detected and, first, the charging voltage is adjusted so that the deflected position coincides with a predetermined point. If the position is out of an adjustable range, the pressure of the ink is varied. Based on the adjusted charging voltage, charging voltages (40 steps) for recording droplets are determined. A charge signal generator for charging monitoring ink droplets is independent of a charge signal generator for recording ink droplets.

However, an ink jet recording apparatus may alternatively have a single nozzle head, or one deflection detecting electrode 80*a* for each of the recording ejection ports, or one or plural ink ejection ports for common use in ejecting recording ink and monitoring ink. In any of these cases, a single charge signal generator is usable for both monitoring and charging for recording. In such a case, the latch $LA_1$ and decoder $DA_1$ in the charge voltage generator 200 may be omitted and an arrangement may be made such that, for a phase search and charge level adjustment, a constant voltage such as a 40th step analog reference voltage $V_{c40}$ is coupled to the analog gate AG while, during printing, voltages $V_{c1}$–$C_{c40}$ are coupled to the analog gate repeatedly in a predetermined order in synchronism with charge timing pulses $S_{ct}$.

As will also be noted, the charge detecting electrodes 40*$a_i$*, 40*$a_m$* and charge detector 210 installed in the embodiment shown in FIGS. 1*a*–1*c* may be omitted. Without these components, the controller 240 in the phase search (FIG. 2*b*) will close the relays RL of the deflection detectors 220*a* and 220*b* a moment after clearing the counter 190*d* and then start counting the droplets of ink formed. As this count reaches a predetermined value, the controller 240 will check the output levels of the deflection detectors 220*a* and 220*b* and, if one of said output levels is "1", complete the phase search but, if all of said output levels are "0", it will reset the deflection detectors 220*a* and 220*b* and feed one pulse to the counter 190*d*. Such a procedure will be repeated until one of the output levels of the deflection detectors 220*a* and 220*b* becomes "1".

Furthermore, while the described embodiments alter the target ink pressure by one step every time the charging voltage misses a predetermined adjustable range, the target ink pressure may be varied by one step when the difference between the voltages $V_{m40}$ and $V_{c40}$ is larger than a reference value or it may be varied by a given amount correlated with a difference between the voltages $V_{m40}$ and $V_{c40}$ when said difference is larger than a reference value.

In the foregoing embodiments, a single monitor ejection hole was employed despite the use of a multi-nozzle ink ejection head. A relation between a charging voltage corresponding to a charge code and a deflection for droplets from the monitor hole was measured actually and, then, the charge voltage was compensated relative to the charge code by varying the amplification degree of a charge amplifier. The determined amplification degree was directly applied to each printing charge voltage generator. Strictly speaking, however, there must be taken into consideration a possible uneven distribution of ejection characteristics of individual ejection holes and that of charging characteristics of individual charging electrodes. It may be more desirable therefore to actually measure 40th step deflection positions of ink droplets ejected from all the ejection holes, compute compensatory coefficients $\alpha_i$(i=1-42) for the individual holes by actual measurement of optimum charge voltages on ink droplets from all the holes except the monitor hole, relative to the charge voltage on ink droplets from the monitor hole, store the compensatory coefficients in a read-only memory, and store in the latch $LA_1$ of each charge voltage generator 200*i* a gain indicated by an output code of the counter 200*b* multiplied by a coefficient $a_i$.

While the present invention has been shown and described in connection with specific constructions and arrangements, they are not for restrictive purpose but only for illustrative purpose and various other constructions and arrangements are possible. For example, the counter 160*b* and standard code setter 160*a* of the pressure setting circuit 160 and the counter 260*b* and standard code setter 260*a* of the voltage setting circuit may be omitted altogether and their functions may be allotted to the microcomputer of the controller 240 for instance. The same holds true concerning the counter 200*b*, standard code setter 200*a*, second group of AND gates $AG_3$ and data selector 200*e* included in the charge signal generator 200. Additionally, the microcomputer may take charge of the function of the phase setting circuit 190.

Moreover, use may be made of an ink jet head of any other single nozzle type of multi-nozzle type in place of the head 10 shown in FIG. 1*a*. An example is a head having a plurality of cylindrical electrostrictive vibrators which are common in number to the nozzles and each having one ink ejection port at its leading end while being communicated with a common ink passage of the head at one end thereof. Another example is a head having cylindrical electrostrictive vibrators which are spaced from a pressurized ink box and communicated therewith by pipes and mounted on a fixed support or an ejection direction adjusting base.

Various modifications will become possible for those skilled in the art after receiving the teachings of the present disclosure without departing from the scope thereof.

What is claimed is:

1. An ink jet printing apparatus comprising:

an ink ejection head for ejecting a jet of ink;

charging means for electrostatically and selectively charging ink droplets separated from the ink jet;

deflection means for electrostatically deflecting the charged ink jet;

deflection detecting means for detecting a deflection position when a reference charging voltage is applied to the ink jet; and control means for controlling the deflection detecting means to adjust a voltage level which determines an amount of deflection of the ink jet such that the detected actual deflection position coincides with a predetermined reference deflection position;

the control means comprising charging voltage amplifying means having a controllable or adjustable gain, the voltage level being adjusted by selectively varying the gain in accordance with the displacement of an actual deflection position relative to the reference deflection position;

the voltage amplifying means comprising an amplifier element, the gain being controlled by varying an input impedance of the amplifier element by means of impedance selection means;

the impedance selection means comprising a plurality of resistors connected to an input of the amplifier element for determining a value of the input impedance of the amplifier element and a plurality of switching elements connected in series with the respective resistors for switchably selecting a combination of the resistors to thereby determine a desired value of the impedance.

2. An apparatus of claimed in claim 1, in which the voltage level is further adjusted by varying the gain in accordance with a magnitude of a charge of at least one charged ink droplet which is flying ahead of an ink droplet about to be formed.

3. An ink jet printing apparatus comprising:

an ink ejection head for ejecting a jet of ink;

charging means for generating a variable charging voltage for electrostatically charging the ink jet;

deflection means for electrostatically deflecting the charged ink jet;

deflection detecting means for detecting when the ink jet is deflected to a predetermined position and producing a detection signal in response thereto;

sweep means for controlling the charging means to sweepingly vary the charging voltage until the deflection detecting means produces the detection signal; and control means for producing an electrical signal corresponding to a magnitude of the charging voltage at a time the deflection detecting means produces the detection signal, the charging means comprising voltage amplifying means having a variable gain, the control means applying said electrical signal to the voltage amplifying means to set the gain thereof;

the voltage amplifying means comprising an amplifier element and impedance control means for controlling an input impedance of the amplifier element and thereby the gain of the voltage amplifying means, the control means applying said electrical signal to the impedance control means;

the impedance control means comprising a plurality of resistors connected to an input of the voltage amplifying means a plurality of switch means connected to the resistors respectively and decoder means for selectively opening and closing the switch means in accordance with the electrical signal.

4. An apparatus as in claim 3, in which the resistors and switch means are connected in series to constitute respective combinations which are connected in parallel with each other.

5. An apparatus as in claim 3, in which the ink ejection head is constructed to eject the ink jet in such a manner that the ink jet separates into drops, the apparatus further comprising compensating means for sensing a magnitude of charge on a drop which is flying ahead of a drop which is being charged by the charging means and adjusting the gain of the voltage amplifying means in accordance therewith.

6. An apparatus as in claim 3, in which the ink ejection head is constructed to eject the ink jet in such a manner that the ink jet separates into drops, the apparatus further comprising compensating means for sensing magnitudes of charge on a plurality of drops which are flying ahead of a drop which is being charged by the charging means, computing weighted values of said magnitudes, combining said weighted values in a predetermined manner and adjusting the gain of the voltage amplifying means in accordance therewith.

* * * * *